United States Patent [19]
Tajika et al.

[11] Patent Number: 6,118,771
[45] Date of Patent: Sep. 12, 2000

[54] SYSTEM AND METHOD FOR CONTROLLING COMMUNICATION

[75] Inventors: Yosuke Tajika, Kobe; Shinzo Matsubara, Osaka; Takeo Horiguchi, Ibaraki; Kazuaki Iwamura, Kobe, all of Japan

[73] Assignee: Kabushiki Kaisha Toshiba, Kawasaki, Japan

[21] Appl. No.: 08/816,563

[22] Filed: Mar. 13, 1997

[30] Foreign Application Priority Data

| Mar. 14, 1996 | [JP] | Japan | 8-057964 |
| Mar. 15, 1996 | [JP] | Japan | 8-059157 |
| Mar. 26, 1996 | [JP] | Japan | 8-069587 |
| Jul. 23, 1996 | [JP] | Japan | 8-193302 |

[51] Int. Cl.[7] ........................ H04Q 7/00
[52] U.S. Cl. ........................ 370/328; 370/401
[58] Field of Search ........................ 370/401, 381, 370/394, 402, 312, 328, 338, 349, 392

[56] References Cited

U.S. PATENT DOCUMENTS 5,752,003  5/1998  Hart ........................ 395/500

OTHER PUBLICATIONS

Network Working Group, RFC 1531, pp. 1–39, Oct. 1993, R. Droms, "Dynamic Host Configuration Protocol".
Network Working Group, RFC 1112, pp. 1–17, Aug. 1989, S. Deering, "Host Extensions For IP Multicasting".
Network Working Group, RFC 1301, pp 1–38, Feb. 1992, S. Armstrong, et al., "Multicast Transport Protocol".

*Primary Examiner*—Valencia Martin-Wallace
*Assistant Examiner*—Kim T. Nguyen
*Attorney, Agent, or Firm*—Oblon, Spivak, McClelland, Maier & Neustadt, P.C.

[57] ABSTRACT

A server collects network administration information of terminals connected to the self-segment, assembles the collected network administration information into packets, and transfers the packets to other segments. The server stores the relationship, as a table, between the low-level layer address of each terminal connected to a corresponding segment and the corresponding high-level layer address on the basis of the collected network administration information and the network administration information included in packets transferred from other segments, and performs packet transfer between terminals through the segments by looking up this table.

9 Claims, 32 Drawing Sheets

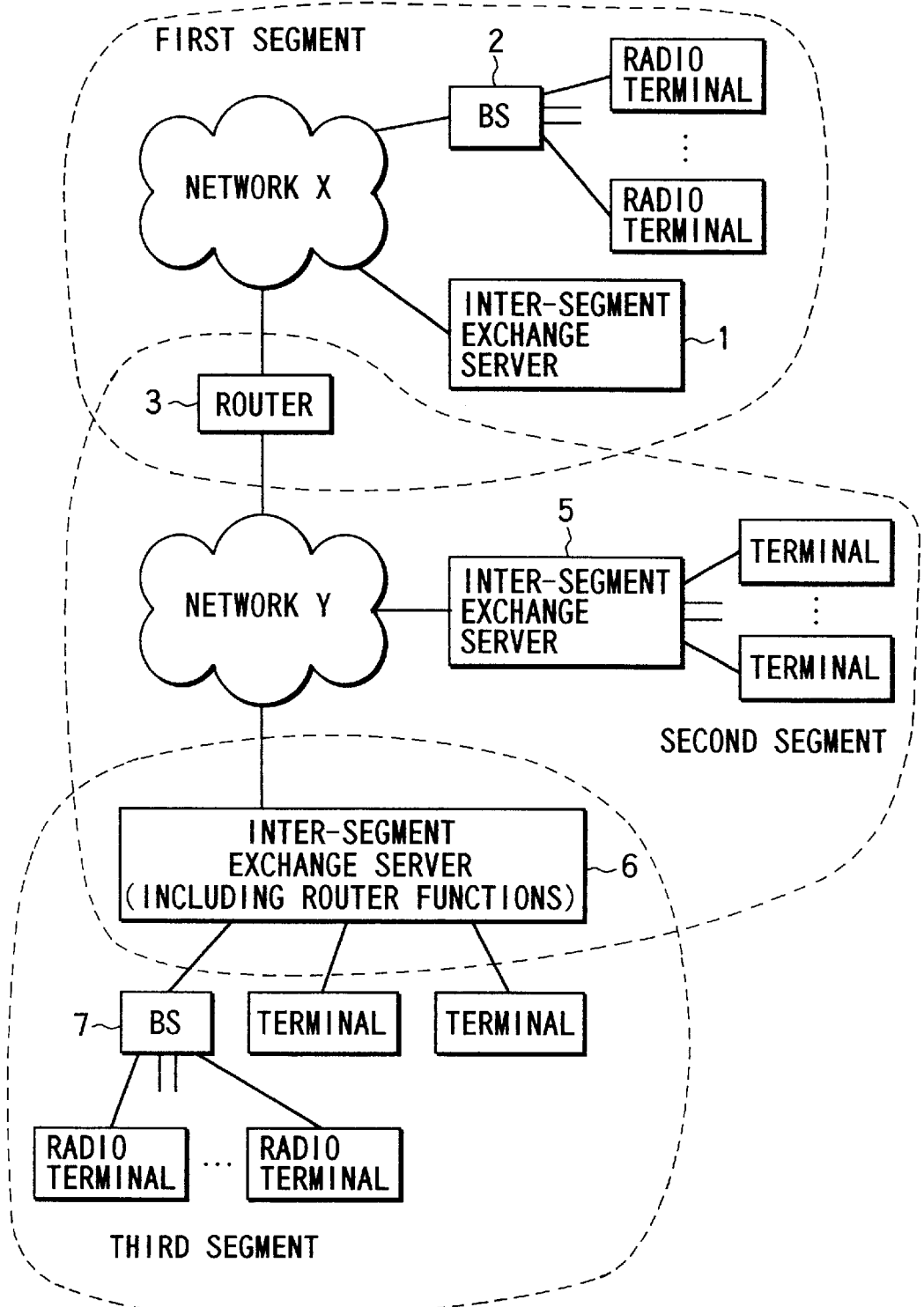
F I G. 1

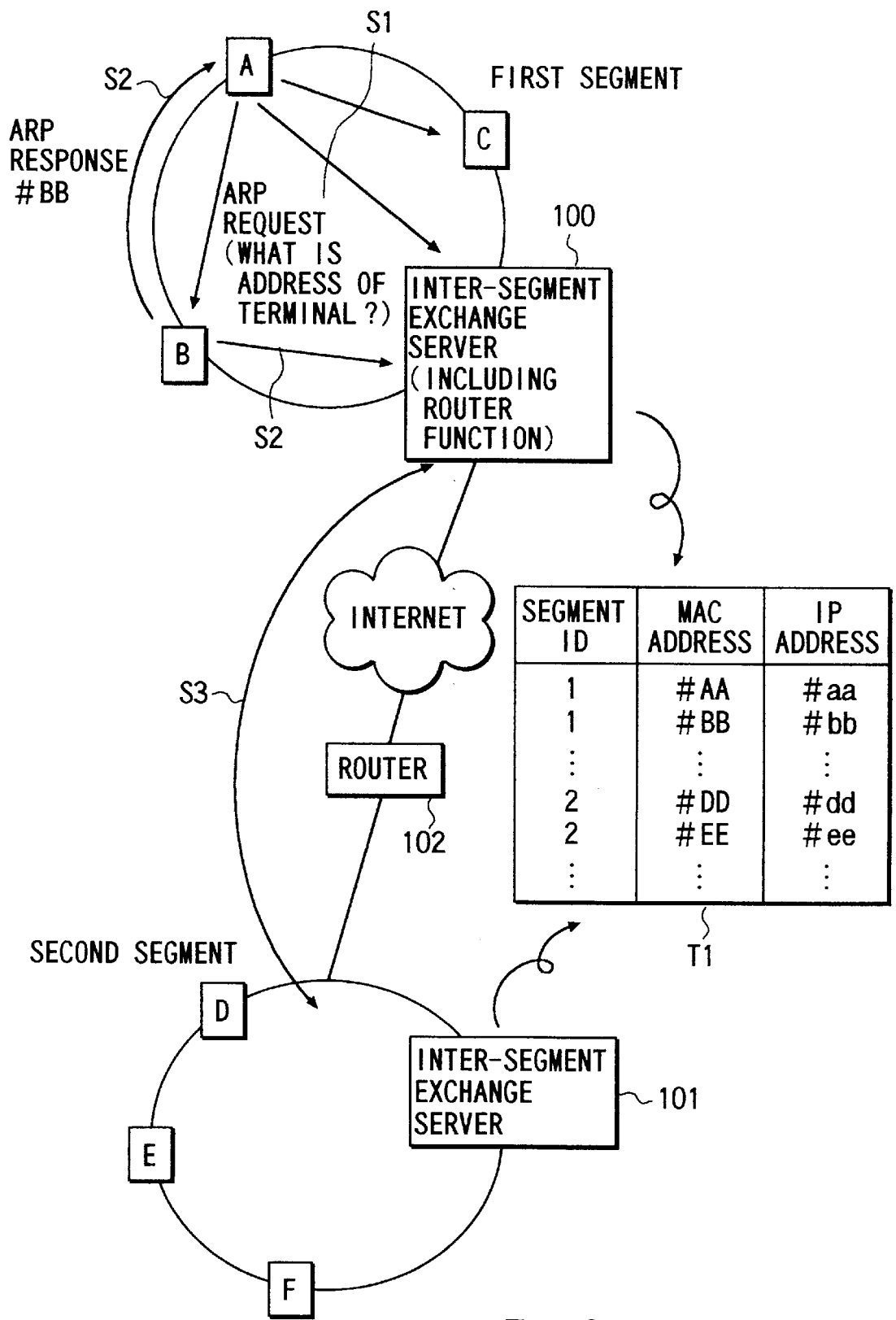
F I G. 4

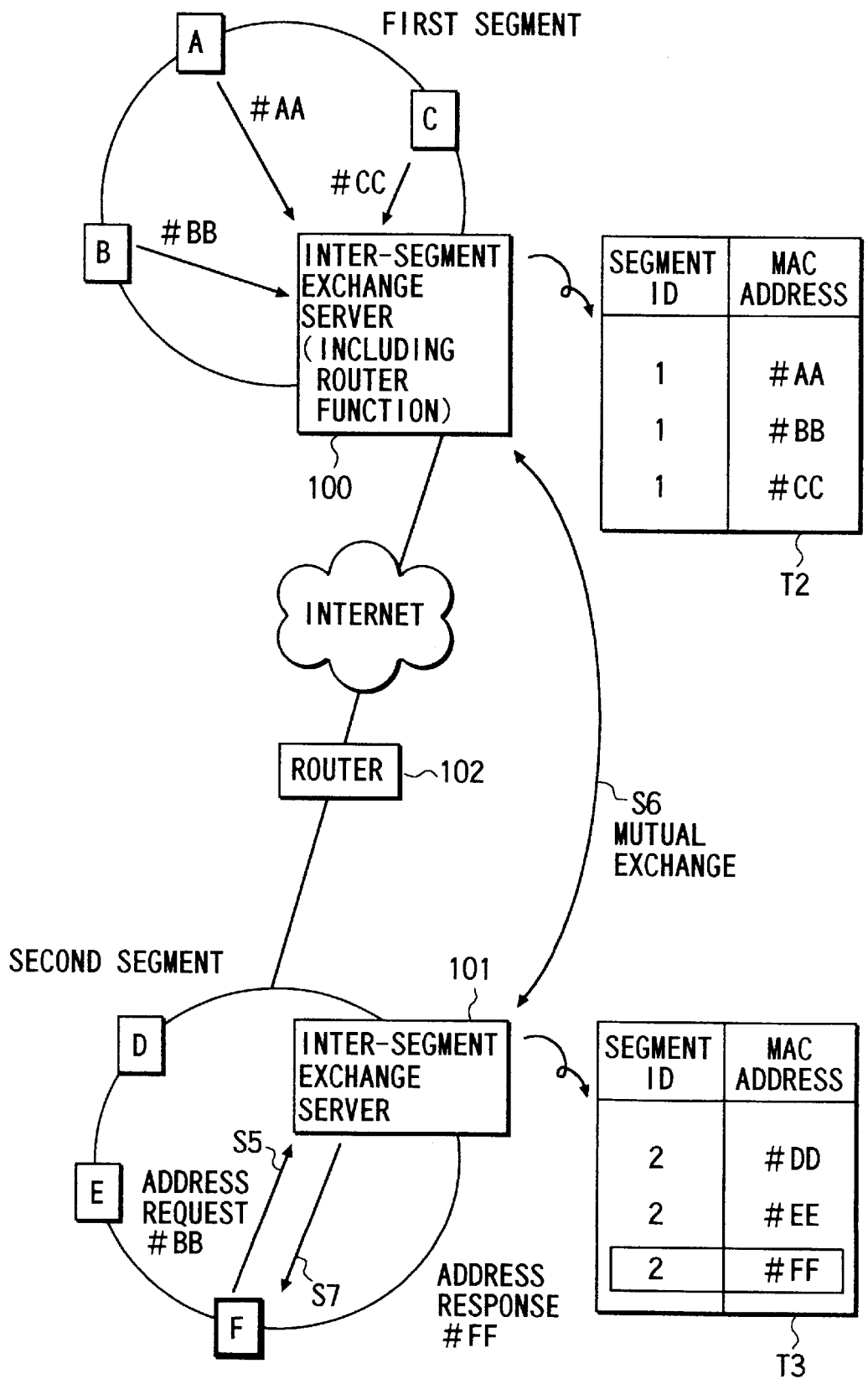
F I G. 5

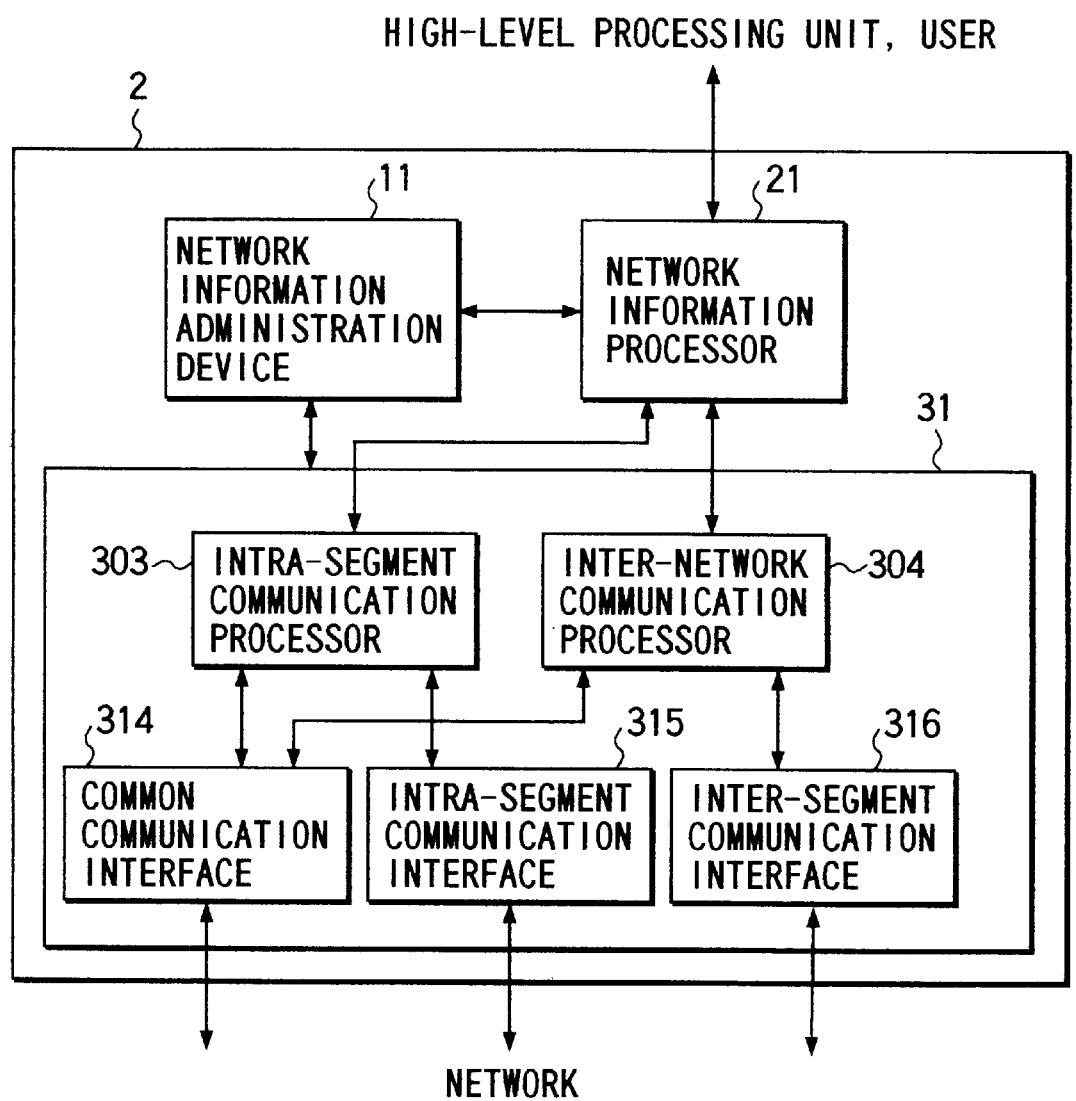
F I G. 7

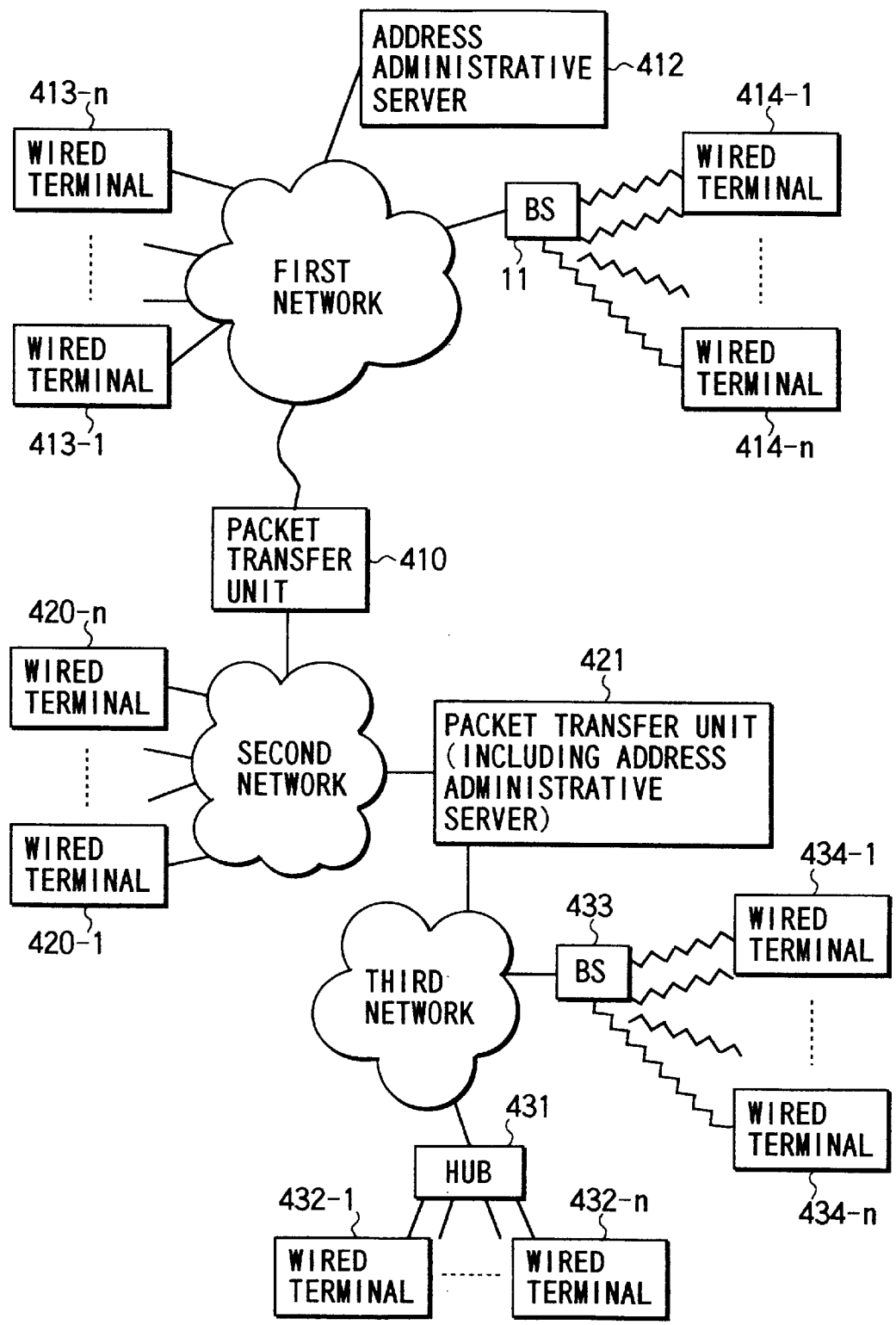
F I G. 10

NETWORK

| HIGH-LEVEL ADDRESS | LOW-LEVEL ADDRESS |
|---|---|
| 133. 198. 81. 3 | 123(MULTICAST X,A,B,C) |
| 133. 198. 81. 123 | 12(UNICAST A) |
| 133. 198. 81. 134 | 14(UNICAST B) |
| ⋮ | ⋮ |

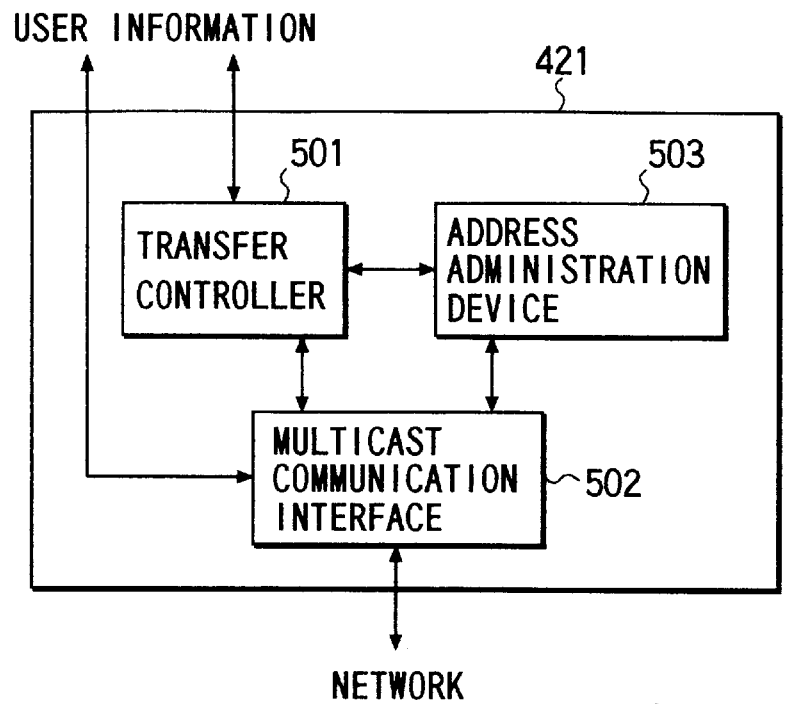
F I G. 13
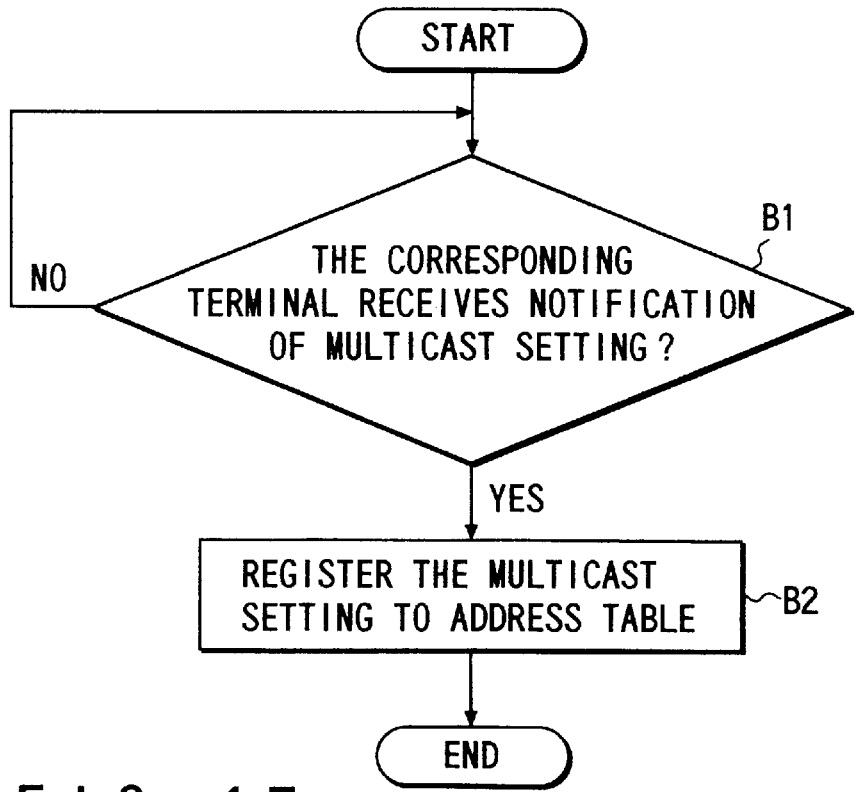
F I G. 15

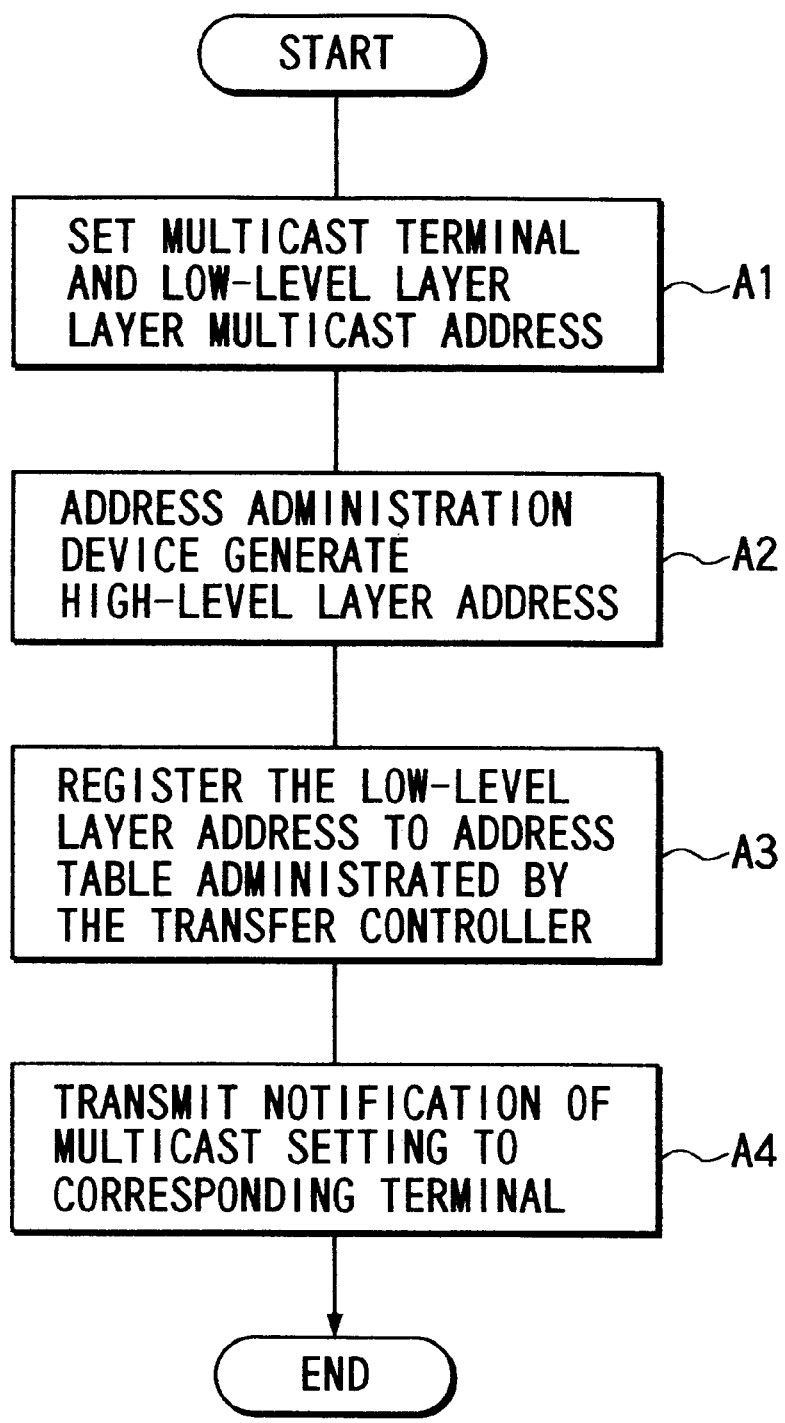
F I G. 14

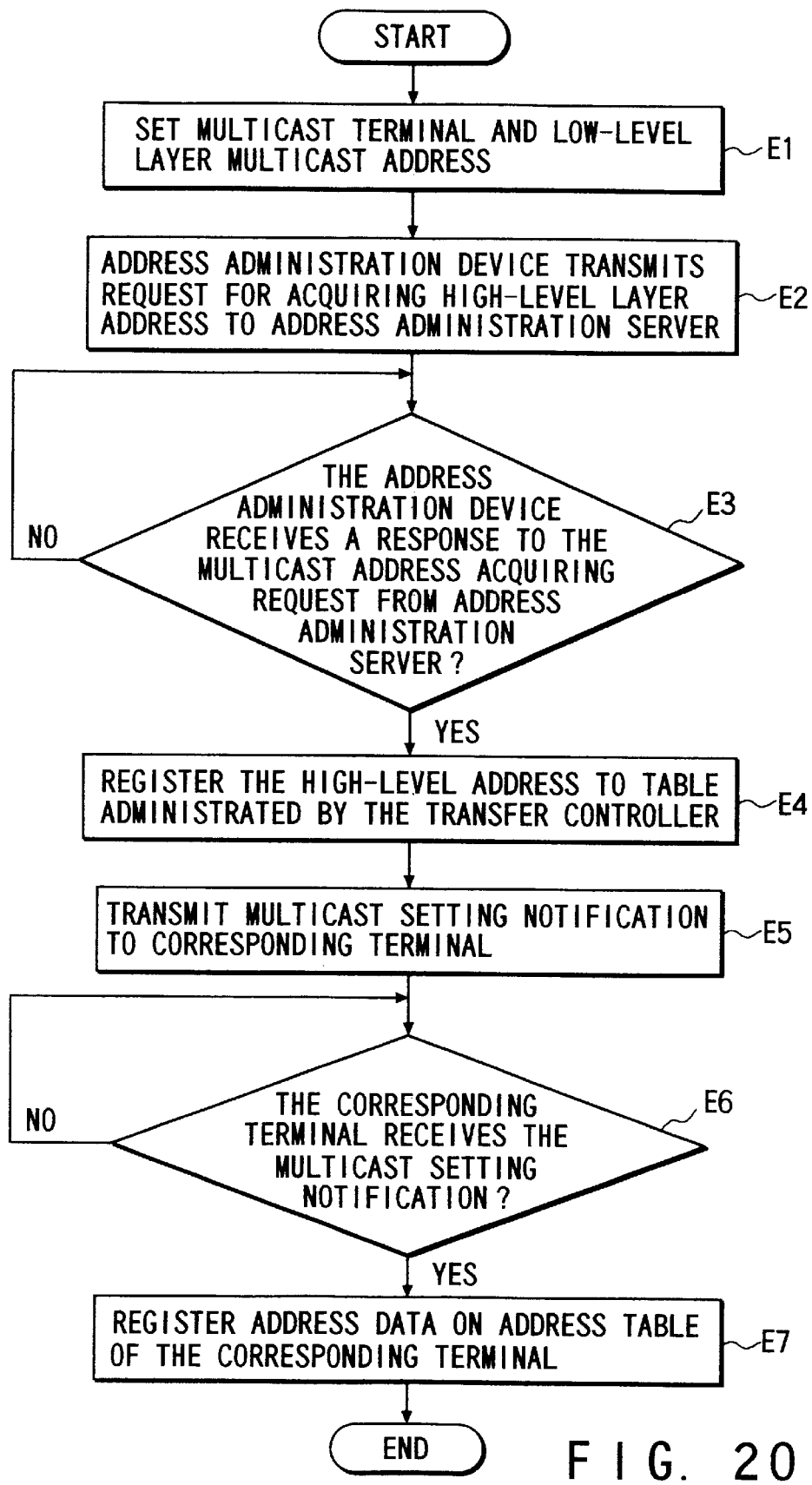
F I G. 20

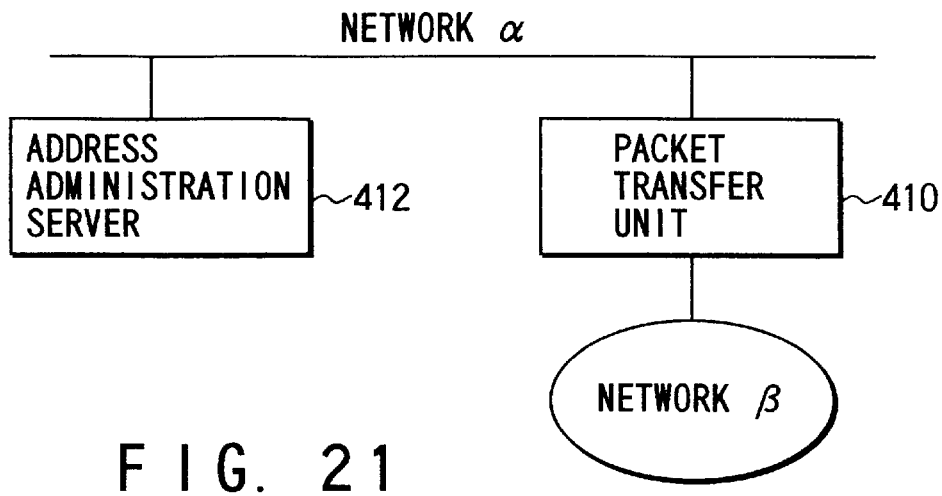
FIG. 21
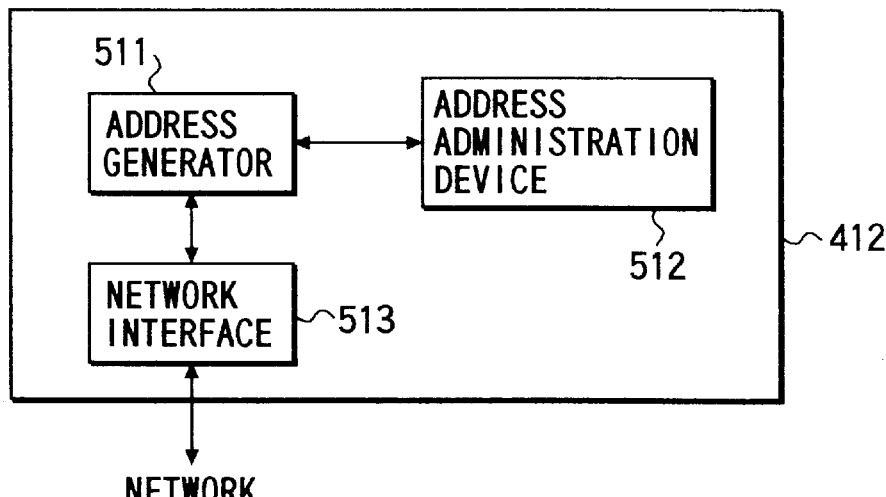
FIG. 23
| ADDRESS | TYPE |
|---|---|
| 133. 198. 81. 129 | 0 |
| 133. 198. 81. 130 | 0 |
| 133. 198. 81. 156 | 1 |
| 133. 198. 81. 157 | 1 |
0: FOR GENERAL INTERNET COMMUNICATION
1: FOR MULTICAST COMMUNICATION
FIG. 24

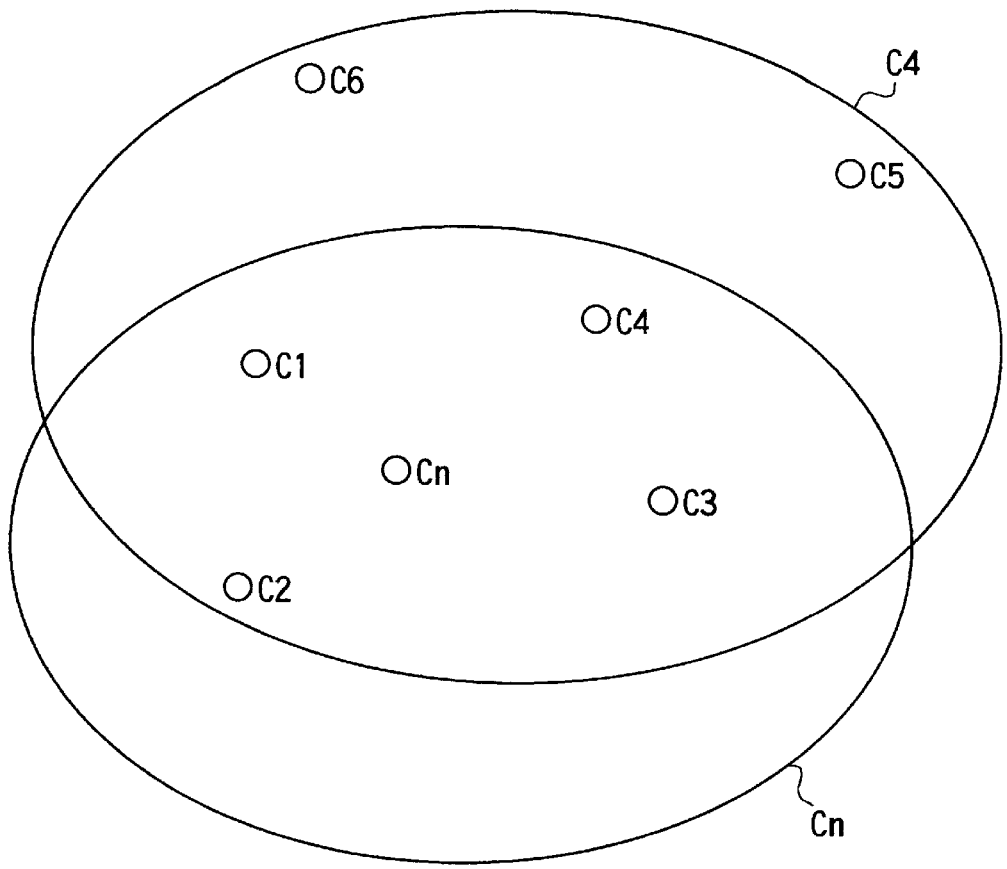
F I G. 27
| COMMUNICATION TERMINAL NAME | TERMINALS WHICH CAN COMMUNICATE WITH TERMINALS WRITTEN ON RIGHT COLUMN |
|---|---|
| Cu | C1, C2, C3, C4, C5 |
| C1 | C2, C3, C4, C6, Cu |
| C2 | C1, C3, C4, Cu |
| C3 | C1, C2, C4, Cu |
| C4 | C1, C2, C3, C5, C6, Cu |
| C5 | C4, Cu |
| C6 | C1, C4 |
F I G. 28

| COMMUNICABLE TERMINAL |
|---|
| C1 |
| C2 |
| C3 |
| C4 |
| C5 |

FIG. 29

| GROUP OPERATION ATTRIBUTE | GROUP IDENTIFICATION DATA | GROUP MEMBER COMMUNICATION TERMINAL |
|---|---|---|

FIG. 30

| GROUP IDENTIFICATION DATA | GROUP PARTICIPATING TERMINAL |
|---|---|
| G1 | Cu, C1, C2 |
| G2 | Cu, C1, C2, C4 |
| G3 | Cu, C1, C3 |

FIG. 31

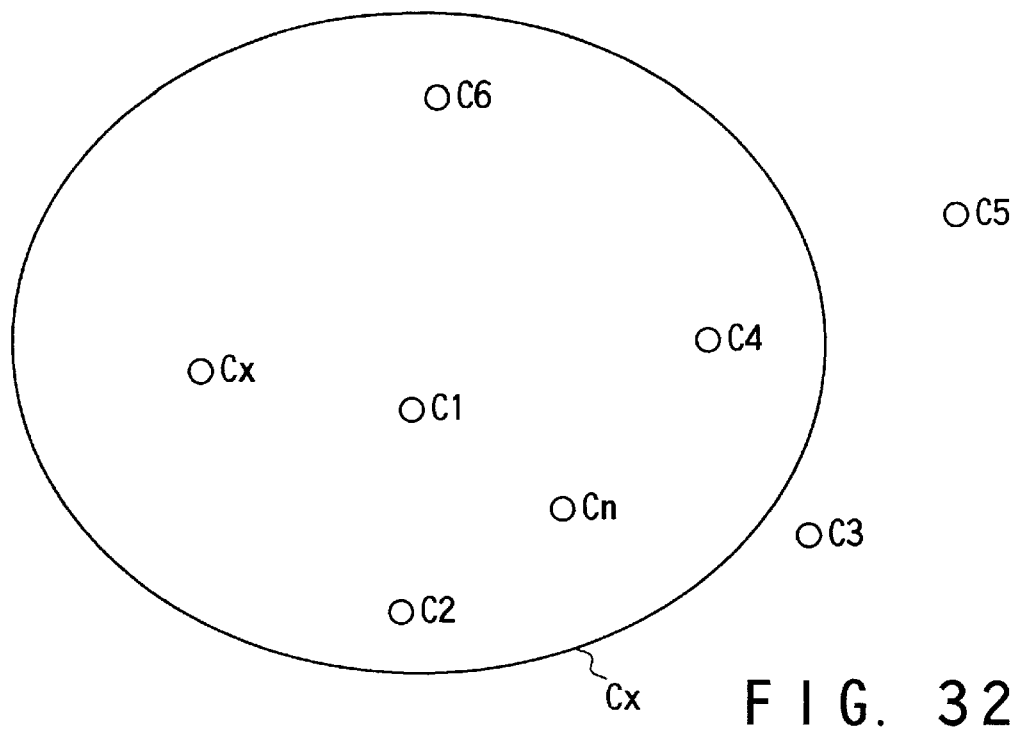
F I G. 32
| COMMUNICATION TERMINAL NAME | TERMINALS WHICH CAN COMMUNICATE WITH TERMINALS WRITTEN ON RIGHT COLUMN |
|---|---|
| Cu | C1, C2, C3, C4, C5, Cx |
| C1 | C2, C3, C4, C6, Cu, Cx |
| C2 | C1, C3, C4, Cu, Cx |
| C3 | C1, C2, C4, Cu |
| C4 | C1, C2, C3, C5, C6, Cu, Cx |
| C5 | C4, Cu |
| C6 | C1, C4, Cx |
| Cx | C1, C2, C4, C6, Cu |
F I G. 33
| GROUP IDENTIFICATION DATA | GROUP MEMBER COMMUNICATION TERMINAL |
|---|---|
F I G. 34

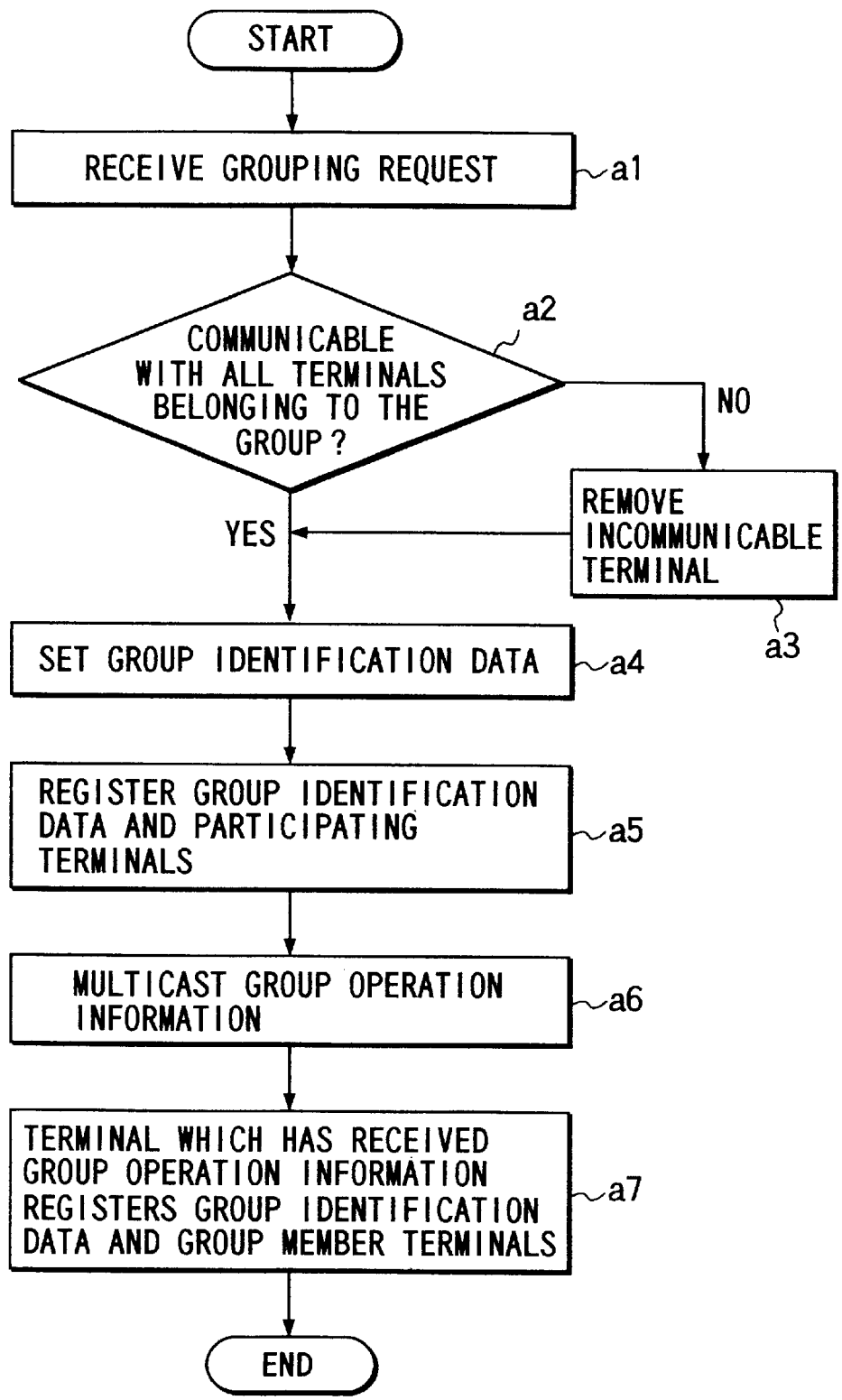
F I G. 35

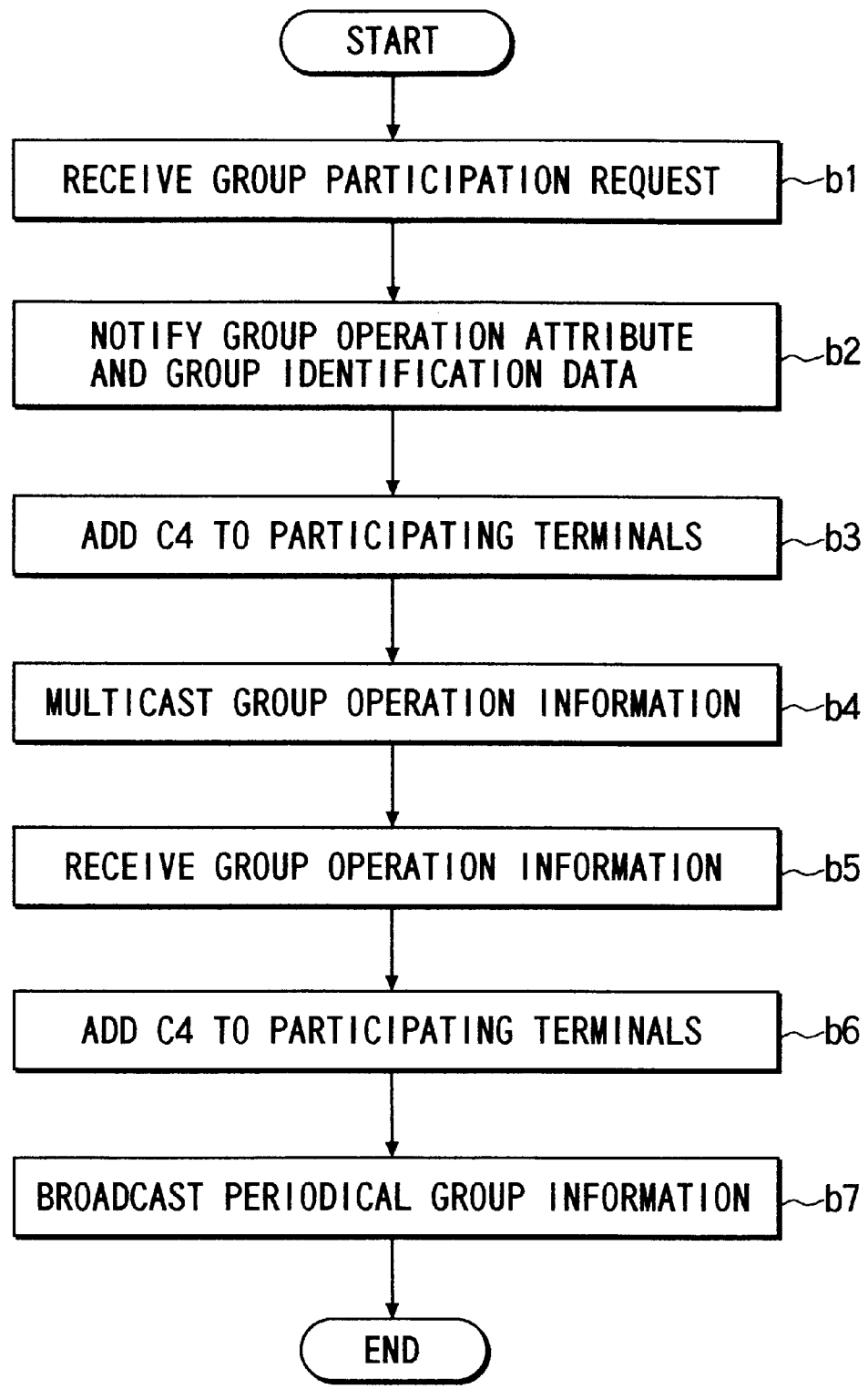
F I G. 36

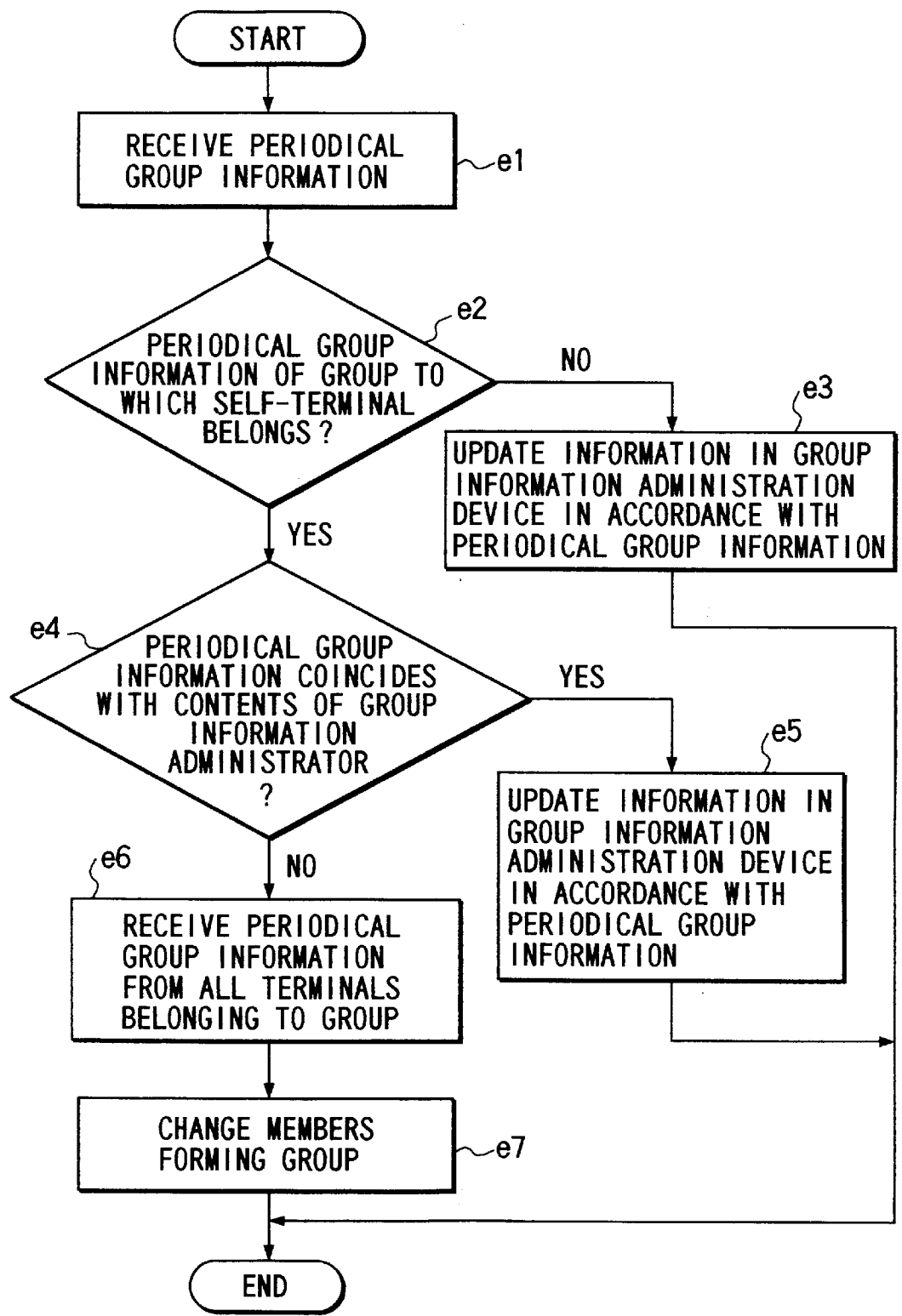
F I G. 39

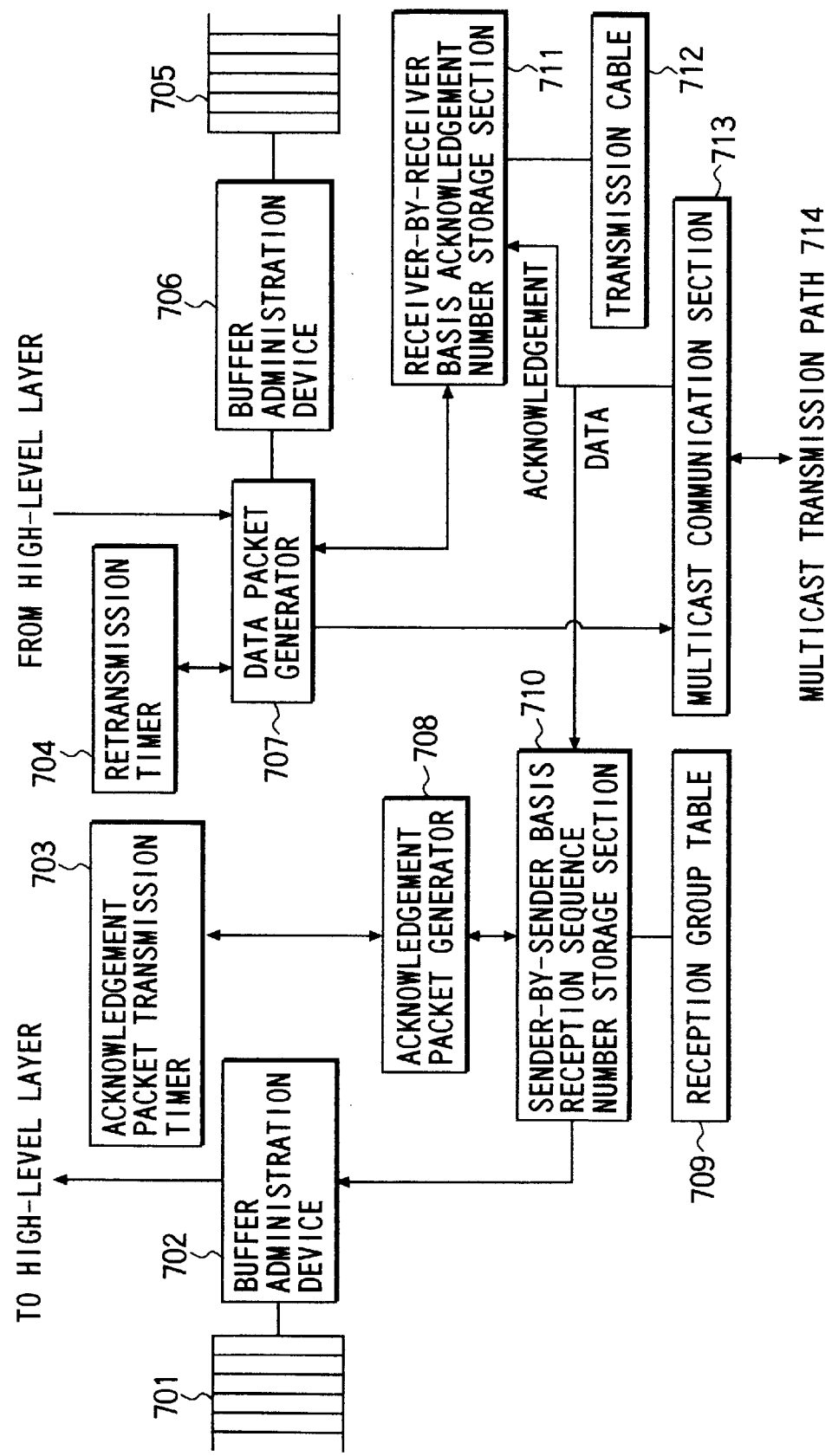
F I G. 40

| GROUP | MEMBER | MAXIMUM SEQUENCE NUMBER RECEIVED | SEQUENCE NUMBER (ACKNOWLEDGEMENT NUMBER) FOR WHICH ACKNOWLEDGEMENT IS TRANSFERRED |
|---|---|---|---|
| GROUP 1 | APPARATUS A | — | — |
| | APPARATUS B | 100 | 100 |
| | APPARATUS C | 150 | 150 |
| GROUP 2 | APPARATUS A | — | — |
| | APPARATUS D | 20 | 20 |
| | APPARATUS E | 110 | 110 |
| | APPARATUS F | 54 | 51 |
| GROUP 3 | APPARATUS A | — | — |
| | APPARATUS G | 60 | 60 |

F I G. 43

| HEADER PORTION (IDENTICAL TO HEADER PORTION IN FIG.42) | |
|---|---|
| GROUP 2 | → GROUP IDENTIFICATION DATA |
| 3 | → NUMBER OF OTHER APPARATUSES OF GROUP |
| APPARATUS D | 20 → MAXIMUM SEQUENCE NUMBER (ACKNOWLEDGEMENT NUMBER) OF SEQUENCE NUMBERS OF DATA PACKETS CONTINUOUSLY RECEIVED FROM APPARATUS D |
| APPARATUS E | 110 → MAXIMUM SEQUENCE NUMBER (ACKNOWLEDGEMENT NUMBER) OF SEQUENCE NUMBERS OF DATA PACKETS CONTINUOUSLY RECEIVED FROM APPARATUS E |
| APPARATUS F | 54 → MAXIMUM SEQUENCE NUMBER (ACKNOWLEDGEMENT NUMBER) OF SEQUENCE NUMBERS OF DATA PACKETS CONTINUOUSLY RECEIVED FROM APPARATUS F |

FIG. 44

| GROUP | MAXIMUM SEQUENCE NUMBER TRANSMITTED FROM SELF-TERMINAL | MEMBER | MAXIMUM ACKNOWLEDGEMENT NUMBER RECEIVED |
|---|---|---|---|
| GROUP 1 | 500 | APPARATUS A | — |
| | | APPARATUS B | 500 |
| | | APPARATUS C | 500 |
| GROUP 2 | 700 | APPARATUS A | — |
| | | APPARATUS D | 699 |
| | | APPARATUS E | 700 |
| | | APPARATUS F | 698 |
| GROUP 3 | 10 | APPARATUS A | — |
| | | APPARATUS G | 10 |

FIG. 45

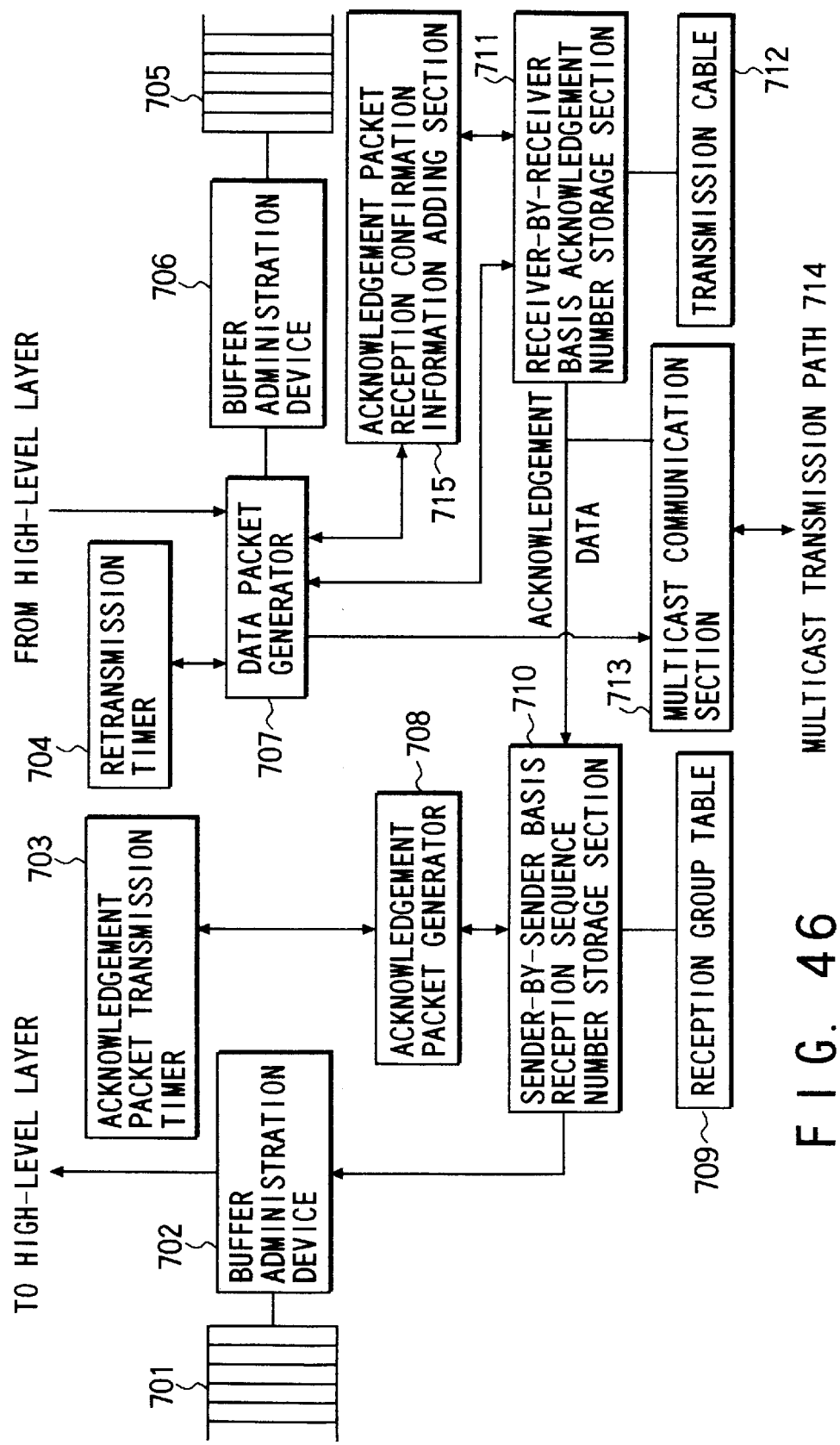
F I G. 46

SYSTEM AND METHOD FOR CONTROLLING COMMUNICATION

BACKGROUND OF THE INVENTION

The present invention relates to a packet transfer method and apparatus which perform packet transfer between a plurality of terminals connected to each other through a plurality of networks each serving as one address administration device.

As a packet transfer scheme within one network segment in which one or a plurality of physical media (e.g., cables) are connected through repeaters, bridges, and the like, NetBEUI (Net Extended User Interface) supported by a LAN manager and Windows NT or the like is available.

According to this scheme, network information (e.g., the address of each terminal and packet transfer control information) is basically administered within a segment as one data link unit in Ethernet, token Ring, or the like, and is subjected to centralized administration in each terminal or a server.

In this case, the terminals complying with such a network protocol can communicate with each other with only simple setting in a given segment, but they cannot communicate with terminals in other segments to which the given segment is connected through routers, gateways, and the like.

TCP/IP corresponding to the fourth and third layers of OSI (Open System Interconnection) as the high-level protocol of each segment allows communication between terminals in a plurality of segments connected to each other through routers, gateways, and the like. TCP/IP allows terminals in all network segments to communicate with each other.

In this case, high- and low-level layer addresses for information transfer are administered by servers arranged in units of segments. These servers do not consistently administer the addresses of the terminals connected to the respective segments connected to each other by the high-level protocols, but divide the address space among them, and use the addresses in the respective address spaces, thereby maintaining the consistency of addresses.

In this manner, address administration is performed by offline distributed processing among the segments. For this reason, the following problem is posed. When, for example, an Ip (Internet protocol) packet (to which an IP address as a high-level layer address and an MAC address as a low-level layer address are added) is to be transferred from a terminal A in a given segment to a terminal B in another segment, the server performs routing with respect to the corresponding segment in accordance with the IP address as a key. In this case, the packet data may not be transferred to the terminal B because of noncoincidence between the low-level layer addresses or the repetitive use of the same low-level layer address.

Each network segment independently administers network administration information including the intra-segment addresses of the terminals in the segment, a high-level layer address such as an IP address, communication control information about an interterminal communication scheme such as 1:1 communication or 1:N communication, and the like. For this reason, inter-segment communication between a plurality of segments cannot be easily performed.

Every time a terminal is disconnected from a given network (sub-network) serving as a segment and connected to another sub-network, a new IP address must be set, resulting in poor operability.

In a conventional packet transfer system constituted by a plurality of network protocol layers, when a packet is to be transferred, the high-level layer checks the destination written in the packet header administered by itself to interpret the destination, and writes the destination information required for the low-level layer to transfer the packet to the destination in the header administered by the low-level layer, thereby transferring the packet.

Assume that in a system in which the Ethernet protocol and the Internet protocol (IP) operate as low- and high-level layers, respectively, a packet is to be transferred to all the terminals in a network (sub-network) serving as one segment (data link address administration device). In this case, when the packet is transferred according to an IP address indicating a sub-network as a destination, the packet is actually transferred to Ethernet as the low-level layer with a multicast address indicating intra-segment multicast.

In this case, destinations administered by the two layers, i.e., high- and low-level layers, are generally administered independently. More specifically, when each terminal uses the Ethernet protocol to set an Ethernet address so as to perform network connection, and IP is used as the high-level layer, each terminal must set an IP address and a sub-network address (MAC address). When a high-level multicast IP address is designated in the above manner by setting this IP address, the packet can be transferred to all the terminals in the corresponding Ethernet segment.

In this case, however, every time a terminal is disconnected from a given sub-network and connected to another sub-network, a new IP address must be set, resulting in poor operability.

In IP, DHCP (Dynamic Host Configuration Protocol) is used to solve the above problem. According to this protocol, when a terminal is to be disconnected from a given network and connected to another terminal group through a network, necessary IP address information can be acquired and set in the self-terminal by only outputting a corresponding request to a DHCP server. Therefore, a new IP address need not be set every time the above operation is performed, thus improving the operability. In this case as well, multicasting by an IP address allows only transfer of information to all the terminals constituting one segment such as Ethernet. For this reason, even if the low-level layer supports multicasting with respect to some specific terminals of the terminals constituting the segment, multicasting with respect to these specific terminals cannot be performed. One-to-one transfer must therefore be repeated, as needed. This is because an IP address is constituted by host and network portions, and has a function of transferring information to a designated segment by using the information of the network portion, specifying terminals in the segment by using the host portion, and transferring the packet to the destinations.

In conventional multicast communication, every time the transmission destinations are changed, the multicast address must be changed. For this reason, in an environment in which radio communication is performed, and an information communication device moves, the multicast address frequently changes. For this reason, the communication procedure becomes complicated to lower the communication efficiency, and a server is required to set a multicast address. Multicasting cannot therefore be performed without a server.

In order to solve these problems, the following method is employed. If there is no server for setting a multicast address, a plurality of terminals to which the same information is transmitted are set as a group on the basis of communication link information administered by the respective terminals by decentralized administration. Multicast communication is performed on the basis of the set group. In this method, a group is set after it is checked whether communication links can be established between a plurality of terminals to be registered as a group. When a given communication link is disconnected, the disconnected terminal is omitted from the group. According to this method, however, when the communication link between some terminals of the plurality of terminals belonging to a group is disconnected, a mismatch is caused between the group information administered by the respective terminals.

When a new terminal appears in a network, the new terminal cannot know the state of a group already set. For this reason, when a group including the new terminal is to be set, the new terminal cannot be added to the set group, but a new group must be set.

In conventional data multicast communication, when data transmitted from the transmission side is properly received by the reception sides, the respective reception sides send response information (acknowledgment numbers) indicating the proper reception to the transmission side. If the data is not properly received by a given reception side, the reception side sends response information for requesting retransmission to the transmission side. Upon reception of the response information for requesting retransmission, the transmission side retransmits the same data.

This operation indicates a 1-to-n one-way connection, in which one apparatus transmits data, and a plurality of apparatuses receive the data. If each communication apparatus is to perform two-way communication, connections equal in number to the apparatuses must be established/maintained. In this method, however, since response information is generated for each transmission apparatus, and an acknowledgment packet is transmitted to each transmission apparatus, each acknowledgment packet inevitably contains only one piece of response information. Therefore, with an increase in the number of communication apparatuses, the number of acknowledgment packets flowing in the network increases. This may increase the load on the network.

Assume that a given apparatus has properly received data, but another apparatus has not properly receive the data. In this case, the transmission side retransmits the data. In a conventional method, however, both the apparatus which has properly received the data and the apparatus which has not properly received the data must return response information with respect to the retransmitted data. That is, the transmission side receives the acknowledgment packet with respect to the same data twice from the apparatus which has properly received the first data and the retransmitted data. The unnecessary acknowledgment packet therefore flows in the network, causing congestion in the network.

BRIEF SUMMARY OF THE INVENTION

It is an object of the present invention to provide a packet transfer method and system which allow all servers in a plurality of network segments to share network administration information of other segments by exchanging network administration information between the servers, thereby realizing easy packet transfer to all terminals.

It is another object of the present invention to provide a packet transfer method and unit which can perform multicasting to specific terminals designated by a low-level layer address (e.g., MAC address) on the basis of a high-level layer address (e.g., IP address).

It is still another object of the present invention to provide a communication control apparatus and method in which when a new terminal appears in a network in performing multicast communication without any server for performing multicast communication, the new terminal is notified of the state of an already set group by another terminal to allow addition of the new terminal to the set group, and even if a mismatch is caused between group information administered by the respective terminals, each terminal can maintain the consistency of group operation data.

It is still another object of the present invention to provide a multicast communication apparatus which stores response information with respect to all apparatuses other than the self-apparatus in one acknowledgment packet to be transmitted from the apparatus, and multicasts the packet.

According to the present invention, there is provided a packet transfer method for performing packet transfer between a plurality of terminals connected to each other through a plurality of networks, comprising forming a table for each network, the table including at least a relationship between a low-level layer address required for intra-network communication between the respective terminals connected to a given network and a high-level layer address required for inter-network communication; collecting network administration information transferred from another network and including at least a low-level layer address of each terminal connected to the network, and updating at least the low-level layer address in the table on the basis of the collected network administration information; and performing packet transfer between the terminals through the plurality of networks by looking up the table.

According to the present invention, there is provided a packet transfer system comprising: a plurality of networks for connecting a plurality of terminals, each of the networks including at least one server for administering network administration information including at least a low-level layer address of each terminal connected to the network, the server including: a storage for storing at least a relationship, as a table, between a low-level layer address required for intra-network communication between the respective terminals connected to the self-network and a high-level layer address required for inter-network communication, a collecting unit for collecting network administration information transferred from a server in another network and including at least a low-level layer address of each terminal connected to the network, a update unit for updating at least the low-level layer address in the table on the basis of the network administration information collected by the collecting unit, and a packet transfer unit for performing packet transfer between the plurality of networks by looking up the table.

According to the present invention, there is provided a packet transfer method of transferring packet data between terminals connected to a plurality of networks on the basis of a low-level layer address of the packet data which is required for intra-network communication, and a high-level layer address required for inter-network communication, comprising storing a relationship, as a table, between a low-level layer address required for multicasting to a plurality of predetermined specific terminals, and a high-level layer address generated in correspondence with the low-level layer address; transferring the generated packet data on the basis of the high-level layer address of the packet data; retrieving the low-level layer address corresponding to the high-level layer address from the table when the high-level layer address of the generated packet data is stored in the table; and multicasting the packet data to the plurality of specific terminals designated by the retrieved low-level layer address.

According to the present invention, there is provided a packet transfer apparatus comprising: an input unit for inputting packet data; a transfer unit for transferring the packet data input by the input unit on the basis of a low-level layer address of the packet data which is required for intra-network communication and a high-level layer address required for inter-network communication; a storage for storing a relationship, as a table, between a low-level layer address required for multicasting to a plurality of predetermined specific terminals and a high-level layer address generated in correspondence with the low-level layer address; and a multicast unit for retrieving a low-level layer address corresponding to the high-level layer address from the table, when the high-level layer address of the packet data input by the input unit is stored in the table, and multicasting the packet data to the plurality of specific terminals designated by the retrieved low-level layer address.

According to the present invention, there is provided a communication control apparatus comprising: a first storage for storing identification data of a plurality of terminals capable of communicating with a self-terminal; a second storage for storing group information constituted by identification of the group and the identification data of the terminals constituting the group; a group operation unit for setting at least one of the communicable terminals stored in the first storage and the self-terminal as a group, changing configuration of the group by adding a terminal to the group or removing a terminal from the group, or deleting an already set group; a controller for updating the group information in the second storage in accordance with group operation information associated with setting, changing, and deleting of the group having undergone an operation of the group operation unit; a first transmitter for transmitting the group operation information to the terminals constituting the group; a second transmitter for periodically transmitting the group information stored in the second storage as periodical group information to at least a terminal which does not belong to the group; and a receiver for receiving group operation information from another terminal belonging to the group, and updating the group information stored in the second storage in accordance with the received group operation information.

According to the present invention, there is provided a communication control method of forming a plurality of terminals capable of communicating with each other into a group, and performing communication within the group, comprising storing identification of communicable terminals which can communicate with a self-terminal in a storage; storing group information constituted by identification of the group and identification of the terminals constituting the group in a storage; performing a group operation of setting one or a plurality of terminals of the communicable terminals stored in the storage as the same group, changing configuration of an already set group by adding a terminal to the group or removing a terminal from the group, or deleting an already set group; updating the group information in the storage in accordance with group operation information associated with setting, updating, or canceling of a group which is performed as the group operation; transmitting the group operation information used for the group operation to the terminals constituting the group; periodically transmitting the group information stored in the storage, as periodical group information, to at least a terminal which does not belong to the group; and receiving group operation information from another terminal belonging to the group, and updating the group information stored in the storage in accordance with the received group operation information.

According to the present invention, there is provided a multicast communication control apparatus comprising: a packet generator for assembling information to be transmitted to a communication group constituted by a plurality of communication control units into packets, storing header information in the packets, and assigning sequence numbers to the packets; a storage for storing, for each of the multicast communication control units, a latest sequence number of continuous sequence numbers of packets transmitted from each of the multicast communication control units to the group; and an acknowledgment packet generator for forming an acknowledgment packet containing latest sequence numbers from all the multicast communication control units in the group stored in the storage.

According to the present invention, there is provided a multicast communication control apparatus comprising: a packet generator for assembling information to be transmitted to a communication group including a plurality of communication control units into packets, storing header information in the packets, and assigning sequence numbers to the packets; a confirmation information supplier for adding, to the packets, information indicating whether an acknowledgment packet is received from each of units; and an acknowledgment packet generator for generating an acknowledgment packet only when a packet to which information indicating that no acknowledgment packet has been received is added is received.

Additional objects advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the overall arrangement of a packet transfer system according to an embodiment of the present invention;

FIG. 4 is a block diagram for explaining a procedure for exchanging network administration information between segments;

FIG. 5 is a block diagram for explaining a procedure for exchanging network administration information between segments;

FIG. 7 is a block diagram showing the arrangement of an inter-segment exchange server according to the second embodiment of the present invention;

FIG. 10 is a block diagram schematically showing the overall arrangement of a communication system using packet transfer units according to the fifth embodiment of the present invention;

FIG. 13 is a block diagram showing the arrangement of the main part of a packet transfer unit according to the fifth embodiment of the present invention;

FIG. 14 is a flow chart for explaining multicast setting in the packet transfer unit in FIG. 13;

FIG. 15 is a flow chart for explaining multicast setting in the packet transfer unit in FIG. 13;

FIG. 20 is a flow chart for explaining multicast setting in a packet transfer unit according to the seventh embodiment of the present invention;

FIG. 21 is a block diagram for explaining the relationship between the packet transfer unit according to the seventh embodiment and an address administration server;

FIG. 23 is a block diagram showing an example of the arrangement of an address administration server;

FIG. 24 is a view showing an example of how data are stored in a table used for address administration by the address administration server in FIG. 23;

FIG. 27 is a view showing terminals formed into groups within communicable ranges;

FIG. 28 is a view showing a table indicating the communicable states between the respective terminals;

FIG. 29 is a view showing a table indicating communicable terminals in the ninth embodiment;

FIG. 30 is a view showing the format of group information in the ninth embodiment;

FIG. 31 is a view showing a group information administration table in the ninth embodiment;

FIG. 32 is a view showing the positions of terminals inside and outside a communicable range in the ninth embodiment;

FIG. 33 is a view showing a table indicating communicable terminals in the 10th embodiment of the present invention;

FIG. 34 is a view showing the format of periodical group information in the 10th embodiment;

FIG. 35 is a flow chart showing a procedure by which a terminal Cn forms a group, together with terminals C1 and C2;

FIG. 36 is a flow chart showing a procedure by which a terminal C4 participates in a set group G1;

FIG. 39 is a flow chart showing an operation to be performed when the terminal Cx receives periodical group information of the terminals C2 and C6;

FIG. 40 is a block diagram showing a multicast communication control apparatus according to the 11th embodiment of the present invention;

FIG. 43 is a view showing a reception group table for storing the maximum sequence numbers of the sequence numbers of data packets continuously received from the respective apparatuses, and more specifically, a table set in the apparatus A;

FIG. 44 is a view showing the format of an acknowledgment packet, and more specifically, a packet transmitted from the apparatus A to each member of group 2;

FIG. 45 is a view showing a transmission group table for storing the maximum acknowledgment numbers received from the respective apparatuses, and more specifically, a table set in the apparatus A;

FIG. 46 is a block diagram showing an example of the arrangement of a multicast communication control apparatus according to the 12th embodiment of the present invention.

DETAILED DESCRIPTION OF THE INVENTION

Figure 2:
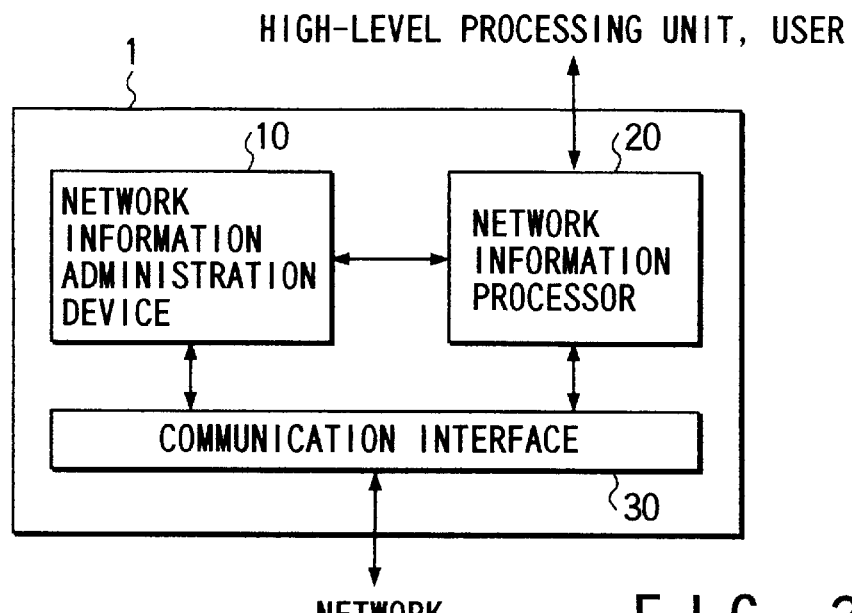
FIG. 2 is a block diagram showing the arrangement of an inter-segment exchange server according to the first embodiment of the present invention.

A packet transfer system according to an embodiment of the present invention will be described with reference to FIG. 1.

Referring to FIG. 1, each of first to third segments is one network or sub-network, when viewed from the network layer of the seven-layer protocols of OSI (Open System Interconnection), in which one or a plurality of physical media (e.g., cables) are connected through repeaters and bridges. In other words, each segment is a network(sub-network) address supply unit, and more specifically, an address administration device on a low-level layer.

When packet transfer is to be performed between terminals connected to one segment, a low-level layer address (e.g., a MAC (Media Access Control) address) contained in the header of a packet is used. When packet transfer is to be performed between terminals through a plurality of segments, a router performs routing of a packet by using the high-level layer address (e.g., an IP address in TCP/IP) contained in the header of a packet, and the packet is transferred to the corresponding segment.

Referring to FIG. 1, an inter-segment exchange server 1, a radio base station (BS) 2 which connects a plurality of radio terminals to allow them to communicate with each other, and a router 3 are connected to a network X so as to constitute the first segment as a subnetwork address administration device.

The inter-segment exchange server (to be sometimes referred to as a server hereinafter) 1 has a function of administering the sub-network addresses of the respective terminals accommodated in the network X, and also has a function of communicating with a server connected to another segment.

An inter-segment exchange server 5 and an inter-segment exchange server 6 serving as a router are connected to a network Y. The network Y is connected to the network X through the router 3. The second segment as another sub-network address administration device is constituted by the router 3 and the servers 5 and 6, which are connected to the network Y, together with a plurality of terminals connected to the servers 5 and 6.

The inter-segment exchange server (to be sometimes referred to as a server hereinafter) 5 has a function of administering the sub-network addresses of the respective terminals accommodated in the network Y, and also has a function of communicating with a server connected to another segment.

A radio base station 7 accommodating a plurality of radio terminals, and a plurality of wired terminals are connected to the server 6 so as to constitute the third segment as still another sub-network address administration device.

The router 3 and the server 6 having a routing function are used to transfer packets between terminals connected to the first to third segments.

FIG. 2 schematically shows an example of the arrangement of an inter-segment exchange server (the inter-segment exchange server 1 in FIG. 1 will be described as an example) according to the first embodiment.

Referring to FIG. 2, the server 1 is constituted by a network information administration section 10, a network information processing section 20, and a communication interface section 30.

Upon reception of information for controlling/administering the network, e.g., the network configuration and the address, i.e., a control packet containing network administration information, the communication interface section 30 passes the information contained in the control packet to the network information processing section 20. The network information processing section 20 then performs predetermined protocol processing for the information, and stores the network administration information in the network information administration section 10.

When a request to transmit a control packet to another terminal is generated by a high-level processor, a user, or the network information processing section 20, necessary information is acquired from the network information administration section 10, and the request to transmit the control packet is output to the communication interface section 30.

Upon reception of the transmission request, the communication interface section 30 outputs the control packet to the network. In this case, if a destination must be designated, the destination is designated in the network information processing section 20, and the communication interface section 30 transmits the packet having the destination information added thereto on the basis of the destination designation.

When the self-segment is to exchange network administration information with a server in another segment, necessary information is acquired from the network information administration section 10 periodically or in response to a request from the high-level processor, the user, or the network information processing section 20. In order to transfer the acquired information in accordance with an inter-segment packet transfer protocol, transfer based on the transfer protocol and destination information for packet transfer to a server in another segment or a plurality of servers in other segments are designated, and the resultant information is passed to the communication interface section 30, together with the network administration information.

Upon reception of these information, the communication interface section 30 generates a packet frame based on the designated packet transfer protocol, stores the network administration information in the payload, and transmits the packet to the designated server or servers once or a plurality of number of times in accordance with the number of destinations designated.

Figure 3:
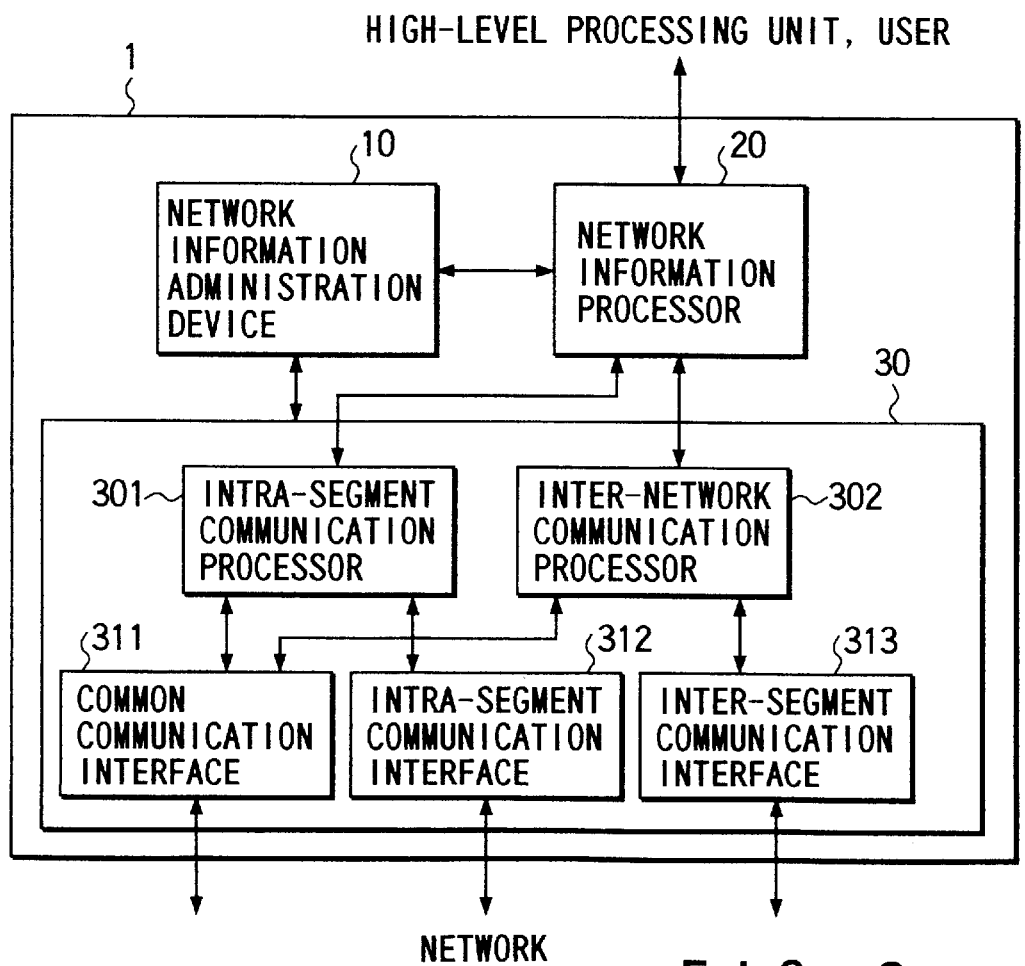
FIG. 3 is a block diagram showing the arrangement of the inter-segment exchange server in FIG. 2 in more detail.

FIG. 3 shows an example of the detailed arrangement of the communication interface section 30. Referring to FIG. 3, the communication interface section 30 includes an intra-segment communication processor 301, an inter-segment communication processor 302, a common communication interface 311, an intra-segment communication interface 312, and an inter-segment communication interface 313.

The common communication interface 311 is used when intra-segment communication and inter-segment communication are to be performed by using the same communication device. For example, the common communication interface 311 is an interface section equivalent to Ethernet as a data link when the intra-segment packet transfer scheme is based on NetBEIU, and the inter-segment packet transfer scheme is based on TCP/IP.

When intra- and inter-segment communications are to be performed by using different communication devices, packet transfer is performed by using the intra-segment communication interface 312 and the inter-segment communication interface 313.

The control packet containing the network administration information and received by the common communication interface 311 or the intra-segment communication interface 312 is subjected to packet processing in the intra-segment communication processor 301. The necessary information is then passed to the network information processing section 20 to be subjected to protocol processing. As a result, the network administration information is extracted and stored in the network information administration section 10. When network administration information is to be transmitted, a packet is generated and transmitted through a reverse route to that for the above operation.

When information is to be exchanged with a server in another segment, a control packet containing network administration information and received by the common communication interface 311 or the inter-segment communication interface 313 is passed to the inter-segment communication processor 302 to be subjected to packet processing. The inter-segment communication processor 302 passes the necessary information to the network information processing section 20. The processing section 20 performs protocol processing for the received information to extract the network administration information, and sends the information to the network information administration section 10 to store it therein. When network administration information is to be transmitted, a packet is generated and transmitted through a reverse route to that for the above operation.

A procedure for exchanging network administration information for terminals accommodated in the respective segments between the servers having the above arrangement, and sharing the network administration information between the respective servers will be described next.

FIG. 4 is a schematic view for explaining the procedure for exchanging network administration information between segments. The first segment is constituted by terminals A, B, and C and a server 100 having a routing function. The second segment is constituted by terminals D, E, and F, a server 101, and a router 102. Assume that the respective terminals in the first segment, including the server 100, and the respective terminals in the second segment, including the server 101, perform TCP/IP communication.

In this case, a table T1 in FIG. 4 is stored in the network information administration section 10 of each server. The table T1 stores the segment IDs (for identifying the segments in which the corresponding terminals are accommodated), intra-segment addresses (e.g., MAC addresses), and high-level layer addresses (e.g., IP addresses) of the terminals accommodated in the respective segments.

Each server needs to collect network administration information of the terminals accommodated in the segment administered by the server. In this case, ARP (Address Resolution Protocol) can also be used. ARP resolves an MAC address by using an IP address as a key.

Assume that the terminal A in the first segment is to transmit an IP packet to the terminal B in the same segment, and that the terminal A has the IP address (high-level layer address) of the terminal B in advance, but does not have the MAC address (intra-segment address) of the terminal B. In this case, the terminal A broadcasts an ARP request within the segment to acquire the MAC address of the terminal B (step S1).

The broadcasted ARP request is received by all the terminals in the first segment, including the server 100. The IP address of the terminal B is written in the ARP request. The terminal B determines from the broadcasted ARP request that the MAC address of the self-terminal is requested, and returns the MAC address of the self-terminal as an ARP reply to the terminal A. At the same time, the terminal B transfers the ARP reply to the server 100 (step S2).

Upon acquisition of the MAC address of the terminal B, the server 100 temporarily stores it in the table T1 set in the network information administration section 10.

By repeating the above procedure, the network administration information of the respective terminals accommodated in the first segment are registered in the table T1 set in the network information administration section 10 of the server 100.

If the IP address of the terminal which has generated the request is registered in the table T1 of the server 100, the server 100 may look up the table T1 and return an ARP reply in response to the ARP request broadcasted within the first segment.

In the second segment as well, network administration information of the respective terminals accommodated in the second segment are registered in the table T1 set in the network information administration section 10 of the server 101 in the same manner as described above.

Note that the servers 100 and 101 may exchange network administration information, and each server may extract the network administration information of the terminals in another segment and register them in its own table to generate the table T1 in FIG. 4.

Subsequently, the server 100 in the first segment and the server 101 in the second segment perform TCP/IP communication, extract the network administration information of the terminals in the respective segments from the tables stored in the network information administration sections 10, convert the information into control packets, and exchange them (step S3).

Upon reception of the control packets from the servers in the respective segments, the servers 100 and 101 extract the network administration information from the control packets, and register them in the tables T1 set in the network information administration sections 10.

As a result, the servers 100 and 101 can administer the network administration information of all the terminals accommodated in the networks constituted by the first and second segments by using the tables T1 set in the servers 100 and 101.

Note that when the servers 100 and 101 are to collect network administration information of terminals accommodated in the segments administered by the respective servers, each server may generate an ARP request by itself.

Another procedure for exchanging network administration information between segments will be described next with reference to FIG. 5.

The procedure shown in FIG. 5 is applied to a system in which a unique intra-segment address is generated in each segment by itself.

The network administration information (e.g., the segment IDs and the intra-segment addresses (e.g., the MAC addresses) of the terminals A, B, and C accommodated in the segment 1 are administered by the server 100. The network information administration section 10 of the server 100 has a table T2 shown in FIG. 5, in which the network administration information of the terminals A, B, and C are registered. Note that the table T2 need not always have a storage field for high-level layer addresses (e.g., IP addresses), and such a field may be added, as needed.

The network administration information (e.g., the segment IDs and the intra-segment addresses (e.g., the MAC addresses) of the terminals D and E accommodated in the second segment are administered by the server 101. More specifically, the network information administration section 10 of the server 101 has a table T3 shown in FIG. 5, in which the network administration information of the terminals D and E are registered. Note that table T3 need not always have a storage field for high-level layer addresses (e.g., IP addresses), and such a field may be added, as needed.

Assume that when the terminal F is newly connected to the second segment, the terminal F transmits a control packet to the server 101 to request assignment of "#BB" as an intra-segment address (step S5).

Upon reception of this control packet, the server 101 exchanges the network administration information of the terminals in the segments administered by itself and another segment with the server in another segment (the server 100 in the first segment in this case), and checks whether intra-segment address "#BB" is used (step S6).

Since the server 101 can determine that intra-segment address "#BB" is used in the first segment, the server 101 transmits, to the terminal F, a control packet indicating that intra-segment address "#FF" is assigned to prevent the repetitive use of the same intra-segment address as that assigned to a terminal in another segment (step S7). Note that if it can be determined that address "#BB" requested by the terminal F is not used, address "#BB" is assigned to the terminal F.

When the servers 100 and 101 repeat the above procedure every time a new terminal is connected, the servers can collect the network administration information of the terminals accommodated in the segments administered by the respective servers.

As described above, when the new terminal F is to determine an intra-segment address in the second segment, a unique intra-segment address can be determined by exchanging network administration information between the servers 100 and 101, regarding the first and second segments as one segment.

When the server in each segment is to assign an address to a newly connected terminal, for example, the server may generate an address by random numbers and notifies other servers of the address. In this case, if this address is not used in other segments, the address is regarded as a unique address throughout the segments, and is assigned to the new terminal.

Assume that network administration information are exchanged between the servers in a plurality of segments, and it is determined that an intra-segment address used in a given segment is used in another segment. In this case, the server in the given segment may notify the corresponding server of the corresponding information as a control packet. In this case, the server which has transmitted the control packet may repetitively perform the following operation: changing the repetitive address to another address to prevent the repetitive use of the same address, and exchanging the network administration information with other servers.

Figure 6:
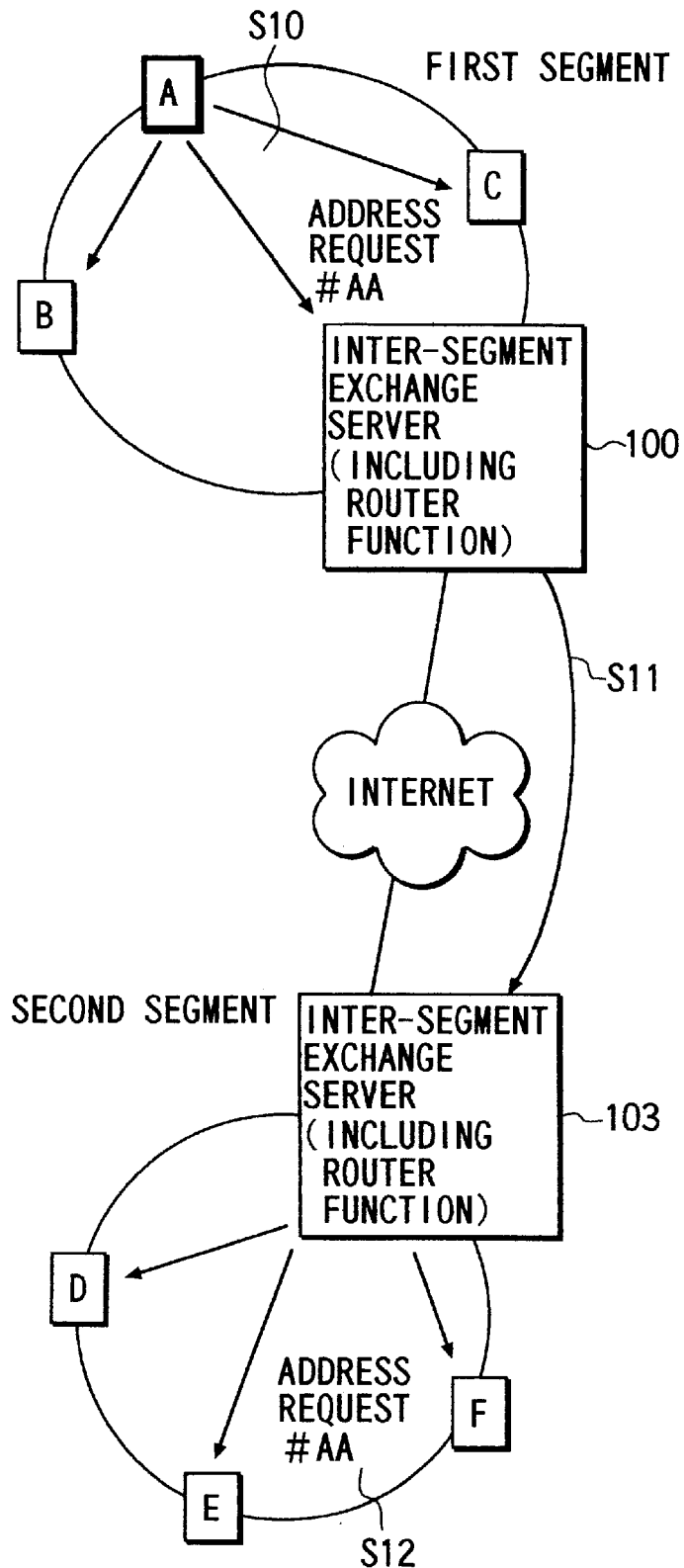
FIG. 6 is a block diagram for explaining a procedure for exchanging network administration information between segments.

Still another procedure for exchanging network administration information between segments will be described next with reference to FIG. 6.

Assume that the radio terminal A is physically connected in the first segment through a radio communication network. In this case, when a data link protocol starts to automatically communicate with the remaining terminals B and C so as to set an intra-segment address and the like, the server 100 receives a packet used to communicate with the remaining terminals in the first segment (a conventional packet for requesting intra-segment address "#AA", which is used only in the segment if the server 100 is present) (step S10), and transfers the received packet as a control packet to the server (a server 103 in this case) in another segment (step S11).

The server 103 supplies the received control packet to the terminals D, E, and F (in the second segment) (step S12). In this case, the server 103 may broadcast the control packet. Subsequently, address assignment is performed in the above manner.

As described above, even if the first and second segments are separated from each other, when their high-level layers are connected to each other, address setting and packet transfer can be performed with the two segments being regarded as one segment.

When, for example, the terminal A in the first segment outputs a control packet as an ARP request in an Internet environment in which the respective segments are connected through routers, as described above (step S10), the server 100 receives the control packet and transfers it to the server 103 in another segment (step S11). The server 103 then broadcasts the control packet in the second segment (step S12). When the corresponding terminal responds to this packet, a control packet as an ARP reply is transferred to the server which has sent the above control packet, i.e., the server 100. Upon reception of this ARP reply, the server 100 registers the corresponding information in the table set in the network information administration section 10.

With the above procedure for exchanging network administration information between segments, the servers 100 and 101 share the network administration information of all the terminals connected to the respective segments.

When each terminal is to transfer a communication packet of general user data by using the intra-segment address, the servers 100, 101, and 103 in the respective segments monitor the intra-segment addresses of communication packets transmitted through the respective segments.

Upon reception of the communication packet, each server refers to the table T1, T2, or T3 stored in the network information administration section 10 to check whether the intra-segment address of the communication packet is addressed to a terminal in another segment. If the intra-segment address is addressed to a terminal in another segment, the communication packet is transferred to the server in the corresponding segment or the servers in all the remaining segments. Upon reception of this transferred communication packet, the server refers to the table T1, T2, or T3 stored in the network information administration section 10 to retrieve the high-level layer address from the intra-segment address, and transfers the communication packet to the corresponding terminal.

As described above, according to the first embodiment, inter-segment communication can be easily performed as intra-segment communication by exchanging network administration information, which are administered by an intra-segment protocol which can be realized by a simple procedure with little setting load on the user, between the servers in a plurality of segments.

In addition, when the speed of inter-segment communication is higher than that of intra-segment communication, the protocol processing load in a server can be reduced, and early network information matching can be realized between all the associated servers by directly transferring a control packet instead of processing inter-segment information in each server and retransmitting the resultant information.

Furthermore, by transferring information packets by the same scheme as that for control information, sharing and a size reduction of the apparatus can be realized.

An inter-segment exchange server according to the second embodiment will be described next by taking the server 1 in FIG. 1 as an example with reference to FIG. 7.

Referring to FIG. 7, upon reception of a control packet, a communication interface section 31 extracts necessary information from the control packet, and passes the information to a network information processor 21. This information is queued in the order of arrival. When a request to transmit a control packet is generated by a high-level processor, a user, or a network information processing section 20 with respect to another terminal at the arrival of the control packet, a request to transmit a control packet to the network is output to the communication interface section 31. Upon reception of the transmission request, the communication interface section 31 outputs the control packet to the network. In this case, if a destination must be designated, destination designation is instructed by the network information processor 21, and the communication interface section 31 transmits the packet having destination information added thereto in accordance with the instruction.

When network administration information are to be exchanged between servers, for example, packets are queued in an inter-segment communication processor 304 in units of target servers. When a request for transmission to another server is generated by a high-level processor, a user, or the network information processor 21, these information are formed into one or a plurality of packets. The packet or packets are then transmitted to the designated server or servers as the destinations once or a plurality of number of times in accordance with the number of destinations.

As described above, according to the second embodiment, if the speed of inter-segment communication is lower than that of intra-segment communication, packets exchanged within a segment are directly transferred to another segment. With this operation, a plurality of packets are transmitted together to decrease the number of packets transferred between the segments, thereby improving the transmission efficiency.

Figure 8:
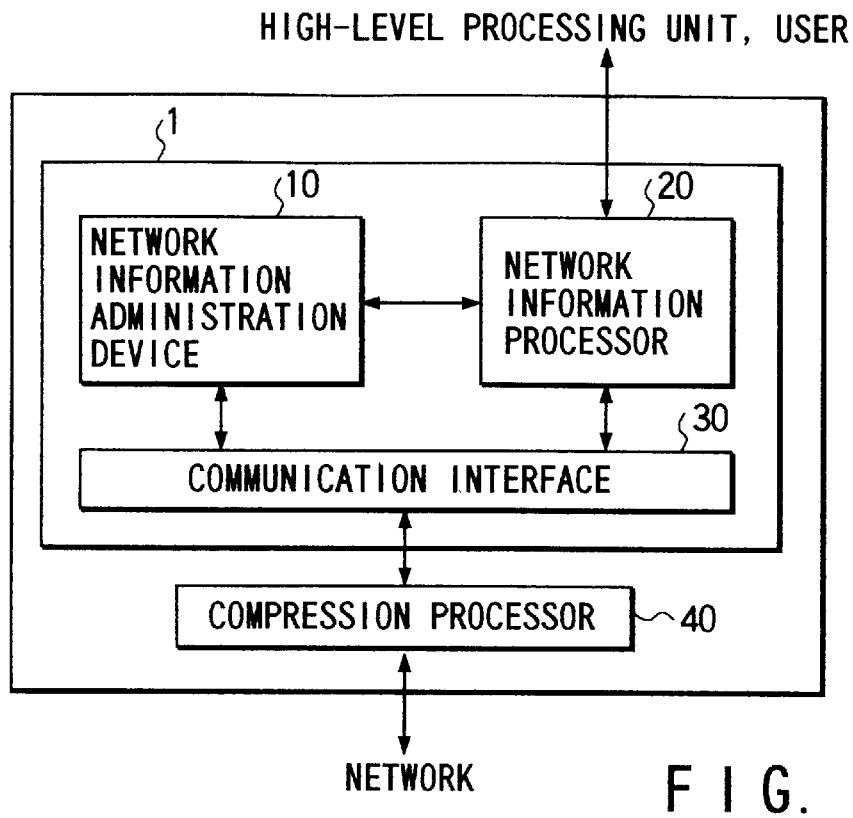
FIG. 8 is a block diagram showing the arrangement of an inter-segment exchange server according to the third embodiment of the present invention.

FIG. 8 shows another arrangement of the inter-segment exchange server according to the third embodiment. The same reference numerals in FIG. 8 denote the same parts as in FIG. 2, and only a different portion will be described below. In the arrangement shown in FIG. 8, a compression processor 40 is arranged on the output side of a communication interface section 30 from which packets are transmitted to the network. With this arrangement, packets are transmitted upon data compression, as needed. Upon reception of a packet from the network, the compression processor 40 checks whether the packet is a compressed packet. If the packet is a compressed packet, the compression processor 40 decompresses the packet, and passes the resultant data to the communication interface section 30.

As described above, according to the third embodiment, when the speed of inter-segment communication is lower than that of intra-segment communication, packets are transmitted upon data compression to reduce the packet length, thereby improving the transfer efficiency as compared with the case wherein packets exchanged within the segment are directly transferred.

Figure 9:
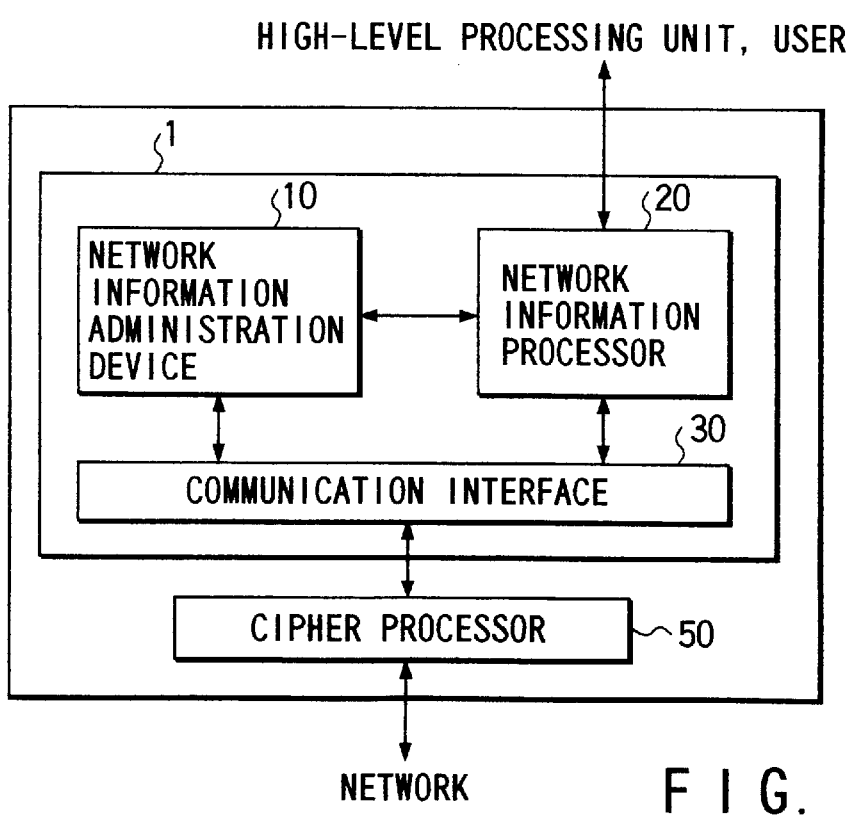
FIG. 9 is a block diagram showing the arrangement of an inter-segment exchange server according to the fourth embodiment of the present invention.

FIG. 9 shows still another arrangement of the inter-segment exchange server according to the fourth embodiment. The same reference numerals in FIG. 9 denote the same parts as in FIG. 2, and only a different portion will be described below. In the arrangement shown in FIG. 9, a cipher processor 50 is arranged on the output side of a communication interface section 30 from which packets are transmitted to the network. With this arrangement, packets are transmitted after they are ciphered, as needed. Upon reception of a packet from the network, the cipher processor 50 determines whether the packet is a cipher packet. If the packet is a cipher packet, the cipher processor 50 decodes the packet, and passes the resultant data to the communication interface section 30.

As described above, according to the fourth embodiment, if there is a possibility of tapping of information in inter-segment communication, data is ciphered and exchanged between servers to keep secrets between the segments, thus improving the security.

According to the above embodiment of the present invention, there are provided a packet transfer method and system which can attain inter-network communication in the same manner as intra-network communication in transferring packets between terminals through a plurality of networks.

A communication system using a packet transfer unit according to the fifth embodiment of the present invention will be described with reference to FIG. 10.

Referring to FIG. 10, a packet transfer unit 410, a radio base station (BS) 411, an address administration server 412, and a plurality of wired terminals 413-1 to 413-n are connected to a network 401. A plurality of radio terminals 414-1 to 414-n are communicatively connected to the radio base station 411.

The packet transfer unit 410 is also connected to a network 402.

A plurality of wired terminals 420-1 to 420-n and a packet transfer unit 421 also serving as an address administration server are connected to the network 402. The packet transfer unit 421 is also connected to a network 403.

A plurality of wired terminals 432-1 to 432-n are connected to the network 403 through a hub 431. A radio base station 433 is also connected to the network 403. A plurality of radio terminals 434-1 to 434-n are communicatively connected to the radio base station 433.

Each of the networks 401, 402, and 403 serves as a network segment (to be simply referred to as a segment hereinafter) as an address administration device for one data link (low-level layer). Packets are transferred by using addresses administered in the respective segments.

Even if the networks 401, 402, and 403 use different low-level layer protocols, the wired terminals 413-1 to 413-n, the radio terminals 414-1 to 414-n, the wired terminals 420-1 to 420-n, the wired terminals 432-1 to 432-n, and the radio terminals 434-1 to 434-n can communicate with each other by using an high-level protocol (TCP/IP corresponding to the fourth and third layers of OSI (Open System Interconnection)).

Each radio base station serves as a radio bridge. For example, each packet transfer unit serves as a router in Internet.

A packet transfer method of this embodiment will be briefly described next.

Figures 11, 12:
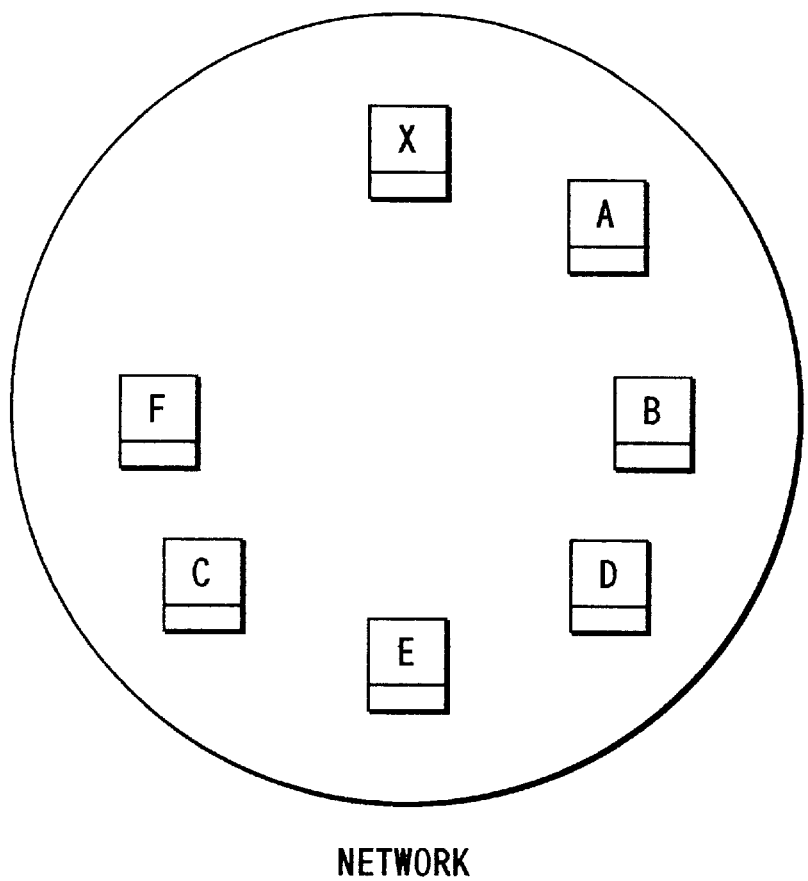
FIG. 11 is a view showing a concrete example of a network to briefly explain a packet transfer method according to the present invention.
FIG. 12 is a view showing an example of how data are stored in an address table set in the transfer controller of a packet transfer unit.

Assume that in a network as a segment having the arrangement shown in FIG. 11, in which terminals X, A, B, C, D, E, and F are accommodated, multicast setting is performed on a low-level layer with respect to the specific terminals X, A, B, and C by using low-level layer (data link) multicast address "123". In this case, for example, a notification of the completion of multicast setting is sent to the terminal X through the high-level layer. Upon reception of this notification, the terminal X generates or assigns a high-level layer address (e.g., a multicast address or unicast address of IP), and stores the resultant data.

FIG. 12 shows a detailed example of the address table stored in the terminal X. In this address table, high-level layer addresses are stored in the high-level layer address field, and low-level layer addresses are stored in the low-level layer address field in correspondence with the high-level layer addresses. In the low-level layer address field, additional information such as multicast/unicast type data and terminal identification data (X, A, B, C) are also stored.

The terminals X, A, B, and C control packet transfer by referring to such address tables.

Assume that in an Internet environment, "133. 198. 81. 3" is assigned as a high-level layer address for multicasting to the specific terminals X, A, B, and C. In this case, upon reception of a notification of transfer to "133. 198. 81. 3" from a high-level layer via an Internet protocol, the terminal X passes a packet to a low-level layer, with transfer address "123" of the low-level layer being added. Upon reception of this packet, the low-level layer transfers the received packet to the terminals A, B, and C corresponding to transfer address "123".

Setting for multicasting are made in the terminals A, B, and C as well as in the terminal X. Each terminal then generates an address table like the one shown in FIG. 12, and stores it. In low-level multicast setting, a single terminal (e.g., the terminal X) may notify the high-level multicast setting to generate a high-level layer address. In this case, the terminal X transfers the high-level multicast information (address "133. 198. 81. 3" and additional information in this case) to the remaining terminals as the destinations of multicasting (the terminals A, B, and C in this case). Upon reception of the high-level multicast information, each of the terminals A, B, and C stores the information in the address table of a transfer controller 501. Each of the terminals X, A, B, and C controls packet transfer by referring to the address table.

Assume that none of the terminals has a function of generating a high-level layer address. In this case, when multicast setting with respect to the specific terminals X, A, B, and C is made by using multicast address "123", the terminal X sends a notification of the completion of multicast setting to the high-level layer. Upon reception of this notification, the high-level layer generates a request to acquire a multicast address of the high-level layer to the specific address administration servers, or broadcasts a request to acquire a multicast address of the high-level layer.

When a multicast address is returned from a given address administration server, the terminal X stores it in the above address table in correspondence with a low-level layer address. In this case, if the remaining terminals as the destinations of multicasting are not notified of low-level multicast setting, the received high-level multicast information is transferred to these terminals as the destinations of multicasting. Upon reception of the high-level multicast information, each of the remaining terminals stores it in its own address table.

The arrangement and operation of the packet transfer unit of the present invention will be described next.

FIG. 13 schematically shows the arrangement of the main part of the packet transfer unit according to the fifth embodiment. This arrangement is applied to the packet transfer units 410 and 421, the wired terminals 413-1 to 413-n, the radio terminals 414-1 to 414-n, the wired terminals 420-1 to 420-n, the wired terminals 432-1 to 432-n, and the radio terminals 434-1 to 434-n in FIG. 10. Note that the arrangement need not be applied to all the wired and radio terminals.

Referring to FIG. 13, the packet transfer unit is mainly constituted by the transfer controller 501, a multicast communication interface 502, and an address administration device 503.

The transfer controller 501 has an address table like the one shown in FIG. 12. Upon reception of a high-level packet from a user, a high-level application protocol, or the like, the transfer controller 501 looks up the address table and retrieves a low-level layer address by the high-level layer address written in the high-level packet, adds the low-level layer address to the packet, and transfers the packet to the multicast communication interface 502 if multicast communication is to be performed. The high-level layer address corresponding to the low-level layer address is set by the address administration device 503. In contrast to this, the transfer controller 501 has a function of transferring a packet received from the multicast communication interface 502 and addressed to the self-terminal to the user, the high-level application protocol, or the like.

In the multicast communication interface 502, low-level multicast or unicast setting is performed by the user or the high-level application protocol, i.e., the self-terminal, or by using a control packet from the multicast communication interface of another terminal. That is, when multicast setting is performed, the multicast communication interface 502 transfers a low-level multicast address and additional information to the address administration device 503. When the multicast communication interface 502 receives an information packet, to which the low-level layer address administered by itself is added, from the transfer controller 501, the interface 502 sends the packet to the network. In contrast to this, if an information packet received from the network is addressed to the self-terminal, the multicast communication interface 502 transfers the packet to the transfer controller 501.

Upon reception of a low-level multicast setting notification and the low-level multicast address from the multicast communication interface 502, the address administration device 503 generates a corresponding high-level layer address, and transfers the address and additional information to the transfer controller 501. The address administration device 503 transfers the high-level multicast address information to specific terminals as the destinations of multicasting, as needed.

The operation of the packet transfer unit in FIG. 13 will be described next with reference to the flow charts of FIGS. 14 to 16.

Referring to FIG. 14, when multicast communication setting on the low-level layer is designated with respect to a plurality of specific terminals by the user of a specific or arbitrary terminal through the multicast communication interface 502, the address administration device 503 is notified of set information including a low-level multicast address (step A1).

Upon reception of the set information of multicast communication on the low-level layer from the multicast communication interface 502, the address administration device 503 generates a high-level layer address corresponding to the low-level multicast address, and transfers high-level multicast information including the generated high-level multicast address to the transfer controller 501, together with the low-level multicast information including the low-level multicast address (step A2).

Upon reception of the high-level multicast information and the low-level multicast information, the transfer controller 501 stores them in an address table like the one shown in FIG. 12 (step A3).

If it is determined that the high-level multicast information and the low-level multicast information must be transferred to the remaining terminals as the destinations of multicasting, the transfer controller 501 passes these information to the multicast communication interface 502 to transfer them (step A4).

FIG. 15 shows the operation of each of the terminals A, B, and C as the destinations of multicasting in FIG. 11 in a case wherein, for example, the low-level multicast information and the high-level multicast information set by the terminal X in FIG. 11 are fabricated in packets and transferred from the multicast communication interface 502 to the terminals A, B, and C in accordance with the flow chart of FIG. 14.

Referring to FIG. 15, when each of the terminals A, B, and C in FIG. 11 receives a multicast setting notification packet including the low-level multicast information and the high-level multicast information from the terminal X (step B1), each terminal extracts high- and low-level multicast addresses from the packet, and passes the addresses to the transfer controller 501. Upon reception of the address information, the transfer controller 501 stores them in the address table shown in FIG. 12 (step B2).

With the operations shown in the flow charts of FIGS. 14 and 15, the high-level layer address, the corresponding low-level layer address, the additional information, and the like are registered in the address table of each of the terminals as the destinations of multicasting (e.g., the terminals X, A, B, and C in FIG. 11).

The operation of each terminal (e.g., the terminals X, A, B, and C in FIG. 11) which is to be performed when an actual data user packet is multicasted will be described next with reference to FIG. 16.

Figure 16:
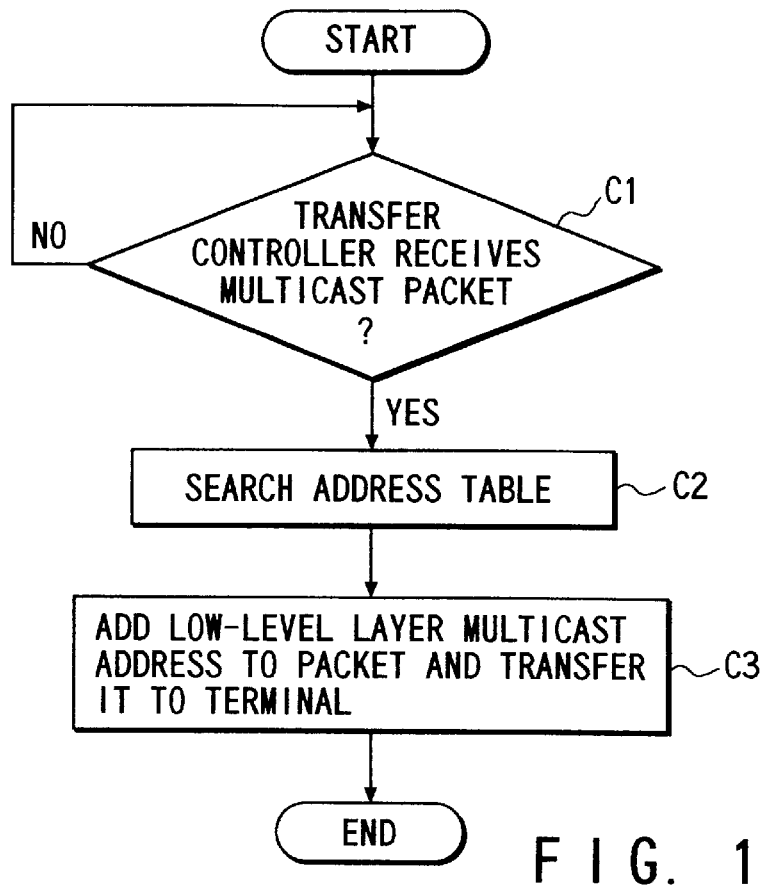
FIG. 16 is a flow chart for explaining multicast packet transfer in the packet transfer unit in FIG. 13.

Referring to FIG. 16, upon reception of a user information packet addressed by a high-level multicast address (step C1), the transfer controller 501 obtains a low-level multicast address corresponding to the high-level layer address (step C2), and transfers a packet to the multicast communication interface 502 after adding transfer information including the low-level multicast address to the header of the packet, or transfers the packet itself and the transfer information including the low-level multicast address to the multicast communication interface 502 in response to different instructions, thereby transferring the above data to the destinations (step C3).

Referring to FIG. 11, for example, in an Internet environment in which an Internet protocol operates on the high-level layer, when the transfer controller 501 of the terminal X receives a transfer notification addressed to "133. 198. 81. 3" from the high-level layer according to the Internet protocol, the transfer controller 501 passes the received data to the low-level layer after adding low-level multicast address "123" to the data. Upon reception of this data, the low-level layer transfers the corresponding packets to the terminals A, B, and C in accordance with address "123".

In the above multicast setting, for example, the terminals X, A, B, and C as the destinations of multicasting in the network as one segment in FIG. 11 may include a terminal designed to perform only the operation shown in FIG. 14, a terminal designed to perform only the operation shown in FIG. 15, and a terminal designed to perform both the operations in FIGS. 14 and 15.

Figure 17:
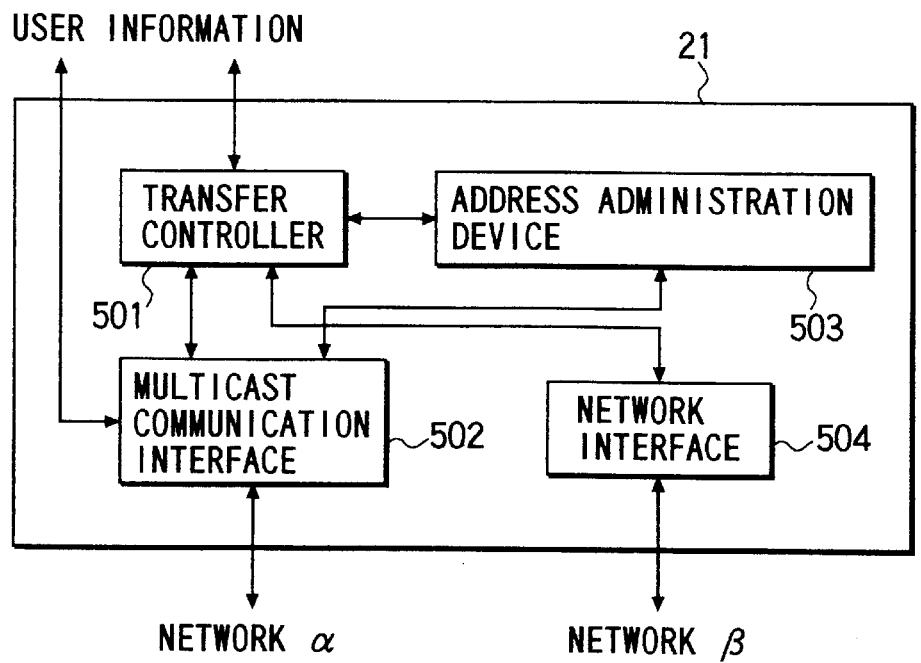
FIG. 17 is a block diagram showing the arrangement of the main part of a packet transfer unit according to the sixth embodiment of the present invention.

FIG. 17 schematically shows the arrangement of the main part of a packet transfer unit according to the sixth embodiment, which is applied, for example, to the packet transfer units 410 and 421 in FIG. 10.

Referring to FIG. 17, the packet transfer unit is mainly constituted by a transfer controller 501, a multicast communication interface 502, an multicast communication interface 502, and a network interface 504.

The transfer controller 501, the multicast communication interface 502, and the address administration device 503 are identical to the transfer controller 501, the multicast communication interface 502, and the address administration device 503 in the fifth embodiment, and hence a description thereof will be omitted.

The network interface 504 performs communication processing equivalent to the same layer as that of the multicast communication interface 502. More specifically, the network interface 504 transfers a packet transferred from the transfer controller 501 to a network β using a protocol different from that used by a network α, unlike the multicast communication interface 502 which transfers the packet to the network α.

If, for example, the transfer controller 501 is a network layer on which an Internet protocol operates, the multicast communication interface 502 is a data link layer equivalent to MAC of a radio LAN, and the network interface 504 is a data link layer equivalent to MAC of Ethernet.

Data to be stored in the low-level layer address filed of the address table set in the transfer controller 501 are not limited to actual low-level layer addresses, and may be identification data for identifying each terminal and a network (segment) in which each terminal is accommodated. In the following description, these data will be referred to as destination data. If each transfer controller 501 retrieves identification data for identifying each terminal, each of the multicast communication interface 502 and the network interface 504 needs a table for retrieving an actual low-level layer address by the identification data of each terminal.

Note that the radio base station 411 in FIG. 10 may include the packet transfer unit having the arrangement shown in FIG. 17.

The operation of the packet transfer unit in FIG. 17 will be described next. Multicast setting is performed in the same manner as described with reference to FIGS. 14 and 15.

Figure 18:
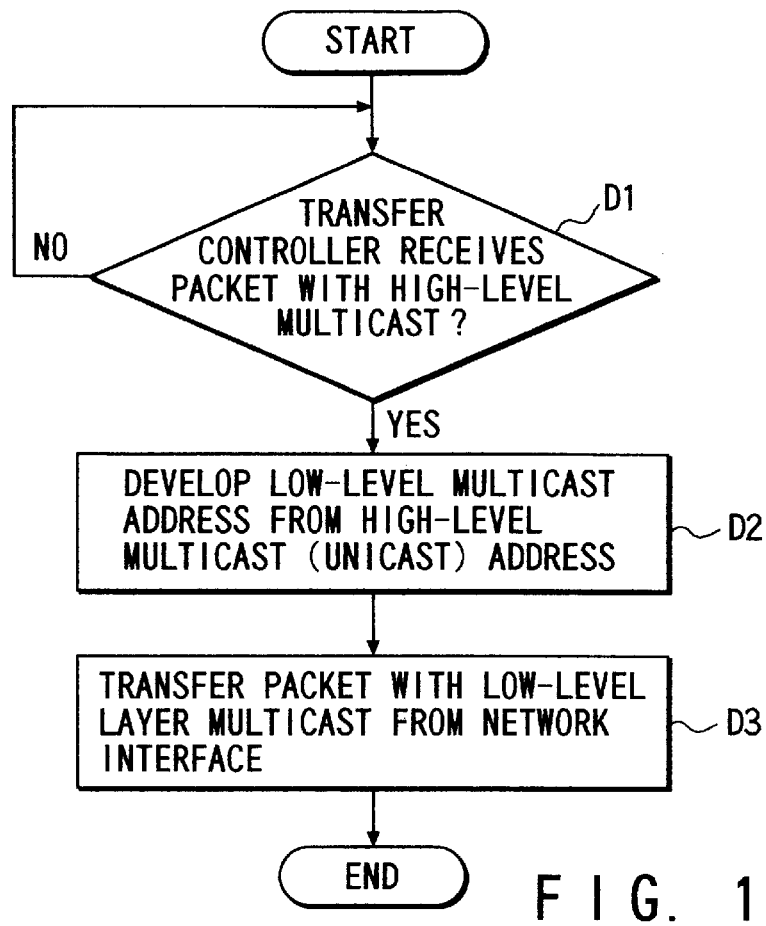
FIG. 18 is a flow chart for explaining multicast packet transfer in the packet transfer unit in FIG. 17.

FIG. 18 is a flow chart for explaining an operation to be performed when a high-level multicast packet is received.

Upon reception of a high-level multicast packet generated by the self-terminal and transferred by a high-level protocol (step D1), the transfer controller 501 looks up the address table set in the transfer controller 501 and shown in FIG. 12 to retrieve low-level destination information by the high-level address (multicast or unicast address) written in the packet. If the retrieved low-level destination information is addressed to the network β, the packet is transferred to the network interface 504. Upon reception of this packet, the network interface 504 outputs the transferred packet to the network β in accordance with the low-level layer address administered by the network interface 504 (steps D2 and D3).

Upon reception of a packet from the network β through the multicast communication interface 502 (step D1), the transfer controller 501 looks up the address table to retrieve low-level destination information by the destination address written in the packet. If the retrieved low-level destination information is addressed to the network α, the packet is transferred to the multicast communication interface 502. Upon reception of the transferred packet, the multicast communication interface 502 outputs the packet to the network α in accordance with the low-level layer address administered by the multicast communication interface 502. If a plurality of destination addresses are retrieved from the address table, i.e., multicasting is to be performed, the multicast communication interface 502 outputs the packet to the network α in accordance with the low-level multicast address to transfer the packet to each of the corresponding terminals (steps D2 and D3).

Upon reception of a packet from the network β through the network interface 504 (step D1), the transfer controller 501 refers to the address table to retrieve low-level destination information by the destination address written in the packet. If the retrieved low-level destination information is addressed to the network α, the packet is transferred to the multicast communication interface 502. Upon reception of the transferred packet, the multicast communication interface 502 outputs the packet to the network α in accordance with the low-level layer address administered by the multicast communication interface 502. If a plurality of destination addresses are retrieved from the address table, i.e., multicasting is to be performed, the multicast communication interface 502 outputs the packet to the network α in accordance with the low-level multicast address to transfer the packet to each of the corresponding terminals (steps D2 and D3).

Figure 19:
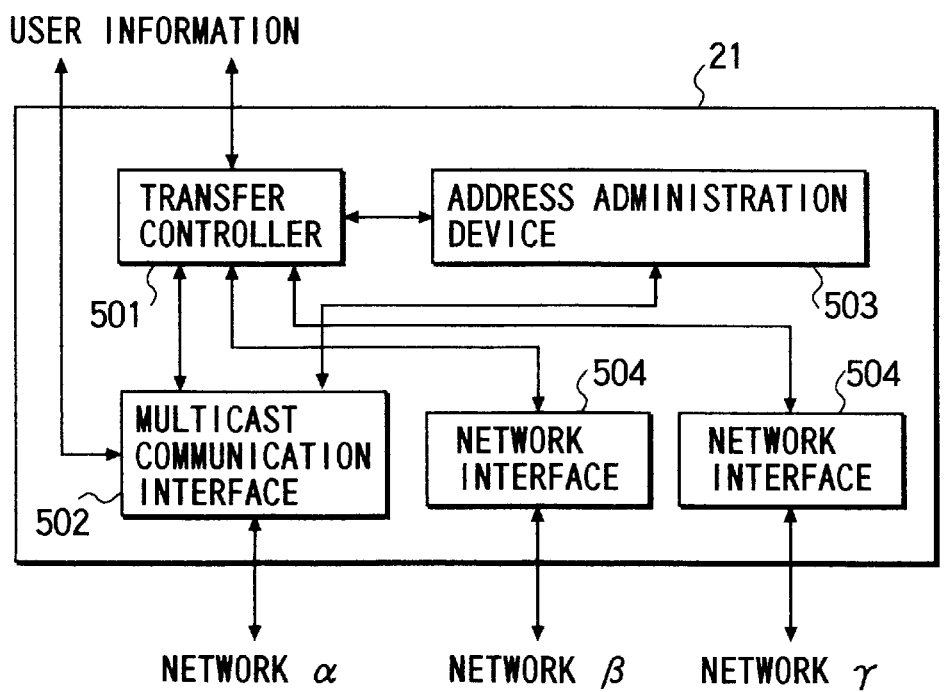
FIG. 19 is a block diagram showing another arrangement of the main part of the packet transfer unit according to the sixth embodiment.

FIG. 19 shows an example of the arrangement of a packet transfer unit including a plurality of network interfaces 504 each identical to the one shown in FIG. 17. When the packet transfer unit is connected to different networks α, β, and γ in this manner, the network interfaces 504 may be arranged in correspondence with the respective networks. More specifically, the multicast communication interface 502 is connected to the transfer controller 501 so that received information is transferred to the transfer controller 501 first. The transfer controller 501 then refers to an address table like the one shown in FIG. 12 to transfer the information to the network interfaces 504 and the multicast communication interface 502 corresponding to the respective high-level destination addresses. These interfaces output the information to the respective networks in accordance with the low-level layer addresses administered by the respective interfaces.

In this case, the networks α, β, and γ may use different protocols or the same protocol. When the networks use the same protocol, it suffices if the networks are physically separated from each other, e.g., use physically different cables.

A packet transfer unit according to the seventh embodiment will be described next. Since the circuit arrangement of this embodiment is the same as that shown in FIG. 17, this packet transfer unit will be described with reference to FIG. 17.

For example, this embodiment is applied to the packet transfer unit 410, the wired terminals 413-1 to 413-n, the radio terminals 414-1 to 414-n, the wired terminals 420-1 to 420-n, the wired terminals 432-1 to 432-n, and the radio terminals 434-1 to 434-n in FIG. 10. Note that the embodiment need not be applied to all the wired and radio terminals.

Referring to FIG. 17, the packet transfer unit is mainly constituted by a transfer controller 501, a multicast communication interface 502, an address administration device 503, and a network interface 504.

The transfer controller 501 has an address table like the one shown in FIG. 12. Upon reception of a packet from a user, a high-level application protocol, or the network interface 504, the transfer controller 501 refers to the address table and retrieves a low-level layer address corresponding to the high-level layer address written in the packet, adds the low-level layer address to the packet, and transfers the packet to the multicast communication interface 502 and the network interface 504. In contrast to this, the transfer controller 501 has a function of transferring a packet received from the multicast communication interface 502 and addressed to the self-terminal to the user, the high-level application protocol, or the like.

In the multicast communication interface 502, low-level multicast or unicast setting is performed by the user or the high-level application protocol, i.e., the self-terminal, or by using a control packet from the multicast communication interface of another terminal. More specifically, when multicast setting is performed, the multicast communication interface 502 transfers a low-level multicast address and additional information to the address administration device 503. When the multicast communication interface 502 receives an information packet, to which the low-level layer address administered by itself is added, from the transfer controller 501, the interface 502 outputs it to the network. In contrast to this, if an information packet received from the network is addressed to the self-terminal, the multicast communication interface 502 transfers the packet to the transfer controller 501.

Upon reception of a low-level multicast setting notification from the multicast communication interface 502, the address administration device 503 adds the high-level layer address of a specific device (e.g., the address administration server 412 in FIG. 10) to a multicast address acquisition request addressed to the specific device, and transfers the resultant request to the transfer controller 501 so as to generate a high-level multicast address. When the transfer controller 501 receives results of the address acquisition request from the multicast communication interface 502 and the network interface 504, the results are transferred. The pair of high-level layer address written in the results and low-level layer address of the corresponding terminal which is stored in the address administration device 503 is transferred to the transfer controller 501, together with additional information. The high-level multicast address information is transferred to specific terminals as the destinations of multicasting, as needed.

The network interface 504 performs communication processing equivalent to the same layer as that of the multicast communication interface 502. The network interface 504 receives an information packet, to which the low-level layer address administered by itself is added, from the transfer controller 501, and outputs the packet to the network. In contrast to this, if an information packet received from the network is addressed to the self-terminal, the network interface 504 transfers the packet to the transfer controller 501.

The operation of the packet transfer unit of the seventh embodiment will be described next with reference to the block diagram of FIG. 17 and the flow chart of FIG. 20.

When low-level multicast communication setting is performed with respect to a plurality of specific terminals through the multicast communication interface 502, or low-level multicast communication setting is designated by the user of a specific or arbitrary terminal, the address administration device 503 is notified of setting completion information including the low-level multicast address (step E1).

Upon reception of information indicating the completion of low-level multicast communication setting from the multicast communication interface 502, the address administration device 503 adds the high-level layer address of a specific device called an address administration server connected to a network α to a high-level layer address acquisition request, and transfers the resultant request to the transfer controller 501 to output the request to the specific device so as to generate a high-level layer address corresponding to the low-level multicast address (step E2).

Figure 22:
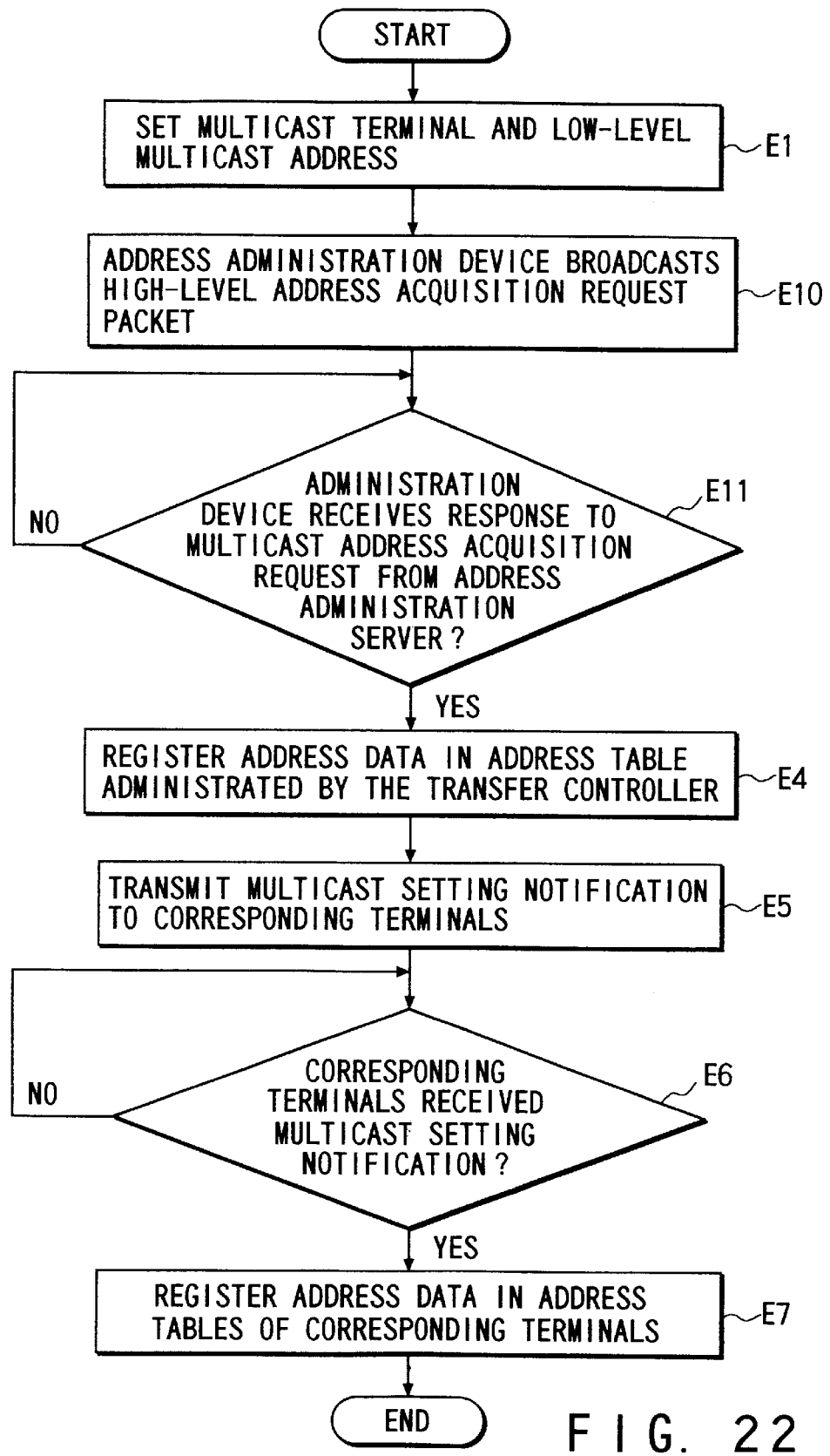
FIG. 22 is a flow chart for explaining multicast setting in a packet transfer unit according to the eighth embodiment of the present invention.

FIG. 22 shows the relationship between a packet transfer unit 410 and an address administration server 412. The address administration server 412 has a function of generating a high-level layer address corresponding to the low-level multicast address upon reception of the multicast address acquisition request, and a function of transmitting the result to the request source.

Referring back to FIG. 20, the transfer controller 501 receives a packet containing the result corresponding to the address acquisition request through the multicast communication interface 502 or the network interface 504, and transfers the packet to the address administration device 503 (step E3).

The address administration device 503 extracts the high-level layer address generated by the address administration server from the packet, and transfers the high-level layer address and the low-level layer address of the corresponding terminal and stored in the address administration device 503, as a pair, to the transfer controller 501, together with additional information. Upon reception of the above address information, the transfer controller 501 stores it in the address table (step E4).

The high-level multicast information and the low-level multicast information are passed to the multicast communication interface 502 to transfer them to other terminals as destinations of multicasting, as needed (step E5).

Upon reception of a multicast setting notification packet including the low-level multicast information and the high-level multicast information, which are transferred by the processing in step E5 (step E6), the multicast communication interface 502 of the terminal corresponding to the low-level layer address extracts the high- and low-level multicast addresses from the packet, and passes them to the transfer controller 501. Upon reception of the above address information, the transfer controller 501 stores them in the address table shown in FIG. 12 (step E7).

Upon reception of a packet whose destination is designated by a high-level layer address from a user, the multicast communication interface 502, or the network interface 504, the transfer controller 501 obtains a low-level multicast address corresponding to the high-level layer address from the address table, and transfers the packet to the multicast communication interface 502, with transfer information containing the low-level multicast address being added to the header of the packet, so as to transfer the packet to its destination. Alternatively, the transfer controller 501 transfers the packet itself and the transfer information containing the low-level multicast address in response to different instructions.

If the packet is addressed to a network β, the low-level multicast address corresponding to the high-level layer address is obtained from the address table, and the packet is transferred to the network interface 504, with the transfer information containing the low-level multicast address being added to the header of the packet, so as to transfer the packet to its destination. Alternatively, the packet itself and the transfer information containing the low-level multicast address are transferred in response to different instructions.

A packet transfer unit according to the eighth embodiment will be described next. The circuit arrangement of this embodiment is the same as that shown in FIG. 17, and hence will be described with reference to FIG. 17.

The same reference numerals in the eighth embodiment denote the same parts as in the seventh embodiment, and only a different portion will be described. The eighth embodiment differs from the seventh embodiment in the operation of the address administration device 503.

Upon reception of a low-level multicast setting notification from a multicast communication interface 502, an address administration device 503 adds a high-level broadcast address to an address acquisition request, and transfers the request to a transfer controller 501 to output the request so as to generate a high-level layer address. When the transfer controller 501 receives the result of address acquisition from a multicast communication interface 502 or a network interface 504, the result is transferred. In the order of arrival or under a predetermined condition, the high-level layer address written in the result and the low-level layer address of the corresponding terminal and stored in the address administration device 503 are transferred as a pair to the transfer controller 501, together with additional information. The high-level multicast address information is transferred to a specific terminal, as needed.

The operation of the packet transfer unit according to the eighth embodiment will be described next with reference to the flow chart of FIG. 22. The same reference numerals in FIG. 22 denote the same parts as in FIG. 20, and only a different portion will be described. That is, steps E2 and E3 in FIG. 20 are replaced with steps E10 and E11 in FIG. 22.

In step E10, the address administration device 503 which has received low-level multicast communication setting information from the multicast communication interface 502 outputs an instruction for broadcasting of an address acquisition request packet to the transfer controller 501 to output a high-level layer address acquisition request so as to generate a high-level layer address. The broadcasted multicast address acquisition request packet is received by a server which is present in the network and equivalent to the address administration server 412 in FIG. 21. The server then generates a high-level layer address corresponding to the low-level multicast address, and transmits the result to the request source.

In step E11, upon reception of a packet containing the result of the address acquisition request through the multicast communication interface 502 or the network interface 504, the transfer controller 501 transfers the packet to the address administration device 503. In this case, results may be returned from a plurality of address administration servers. In this case, one of a plurality of arithmetic results is used as result information on the basis of a predetermined rule, e.g., the order of arrival.

FIG. 23 shows the main part of the arrangement of the address administration server 412 (see FIG. 21) used in the seventh and eighth embodiments described above. Upon reception of an address acquisition request from another terminal, the address administration server 412 generates a high-level layer address corresponding to the low-level multicast address, and transmits the high-level layer address to the request source.

The arrangement shown in FIG. 23 is applied to the address administration server 412 and the packet transfer unit 421 in FIG. 10.

Referring to FIG. 23, the address administration server 412 mainly consists of an address generating section 511, an address administration section 512, and a network interface 513.

The address generating section 511 generates an address (high-level layer address) on the basis of an address acquisition request received from the network interface 513, and transfers the generated address to the address administration section 512 to administer it. In addition, the address generating section 511 outputs an instruction to the network interface 513 to return the generated address to the acquisition request source.

The address administration section 512 administers the address information generated by the address generating section 511.

The network interface 513 transfers an information packet received from the network to the address generating section 511 if the packet is addressed to the self-server and address acquisition request information. The network interface 513 also transfers information sent from the address generating section 511 to the network.

The operation of the address administration server having the arrangement shown in FIG. 23 will be described next.

The network interface 513 transfers an information packet received from the network to the address generator 511 if the packet is addressed to the self-server and an address acquisition request.

For example, the address generator 511 generates an address by using a technique of generating candidates in advance on the basis of an address acquisition request received from the address generator 511, and selecting one of the candidates. For example, the address generator 511 may select one of the addresses in a reserved address space, like a DHCP server in Internet. In this case, the address generator 511 may look up address information which have been generated/used and stored in the address administration device 512. The address generator 511 transfers the generated address to the address administration device 512, and outputs an instruction to the network interface 513 to return the address to the acquisition request source, thereby fabricating the generated address in a packet and outputting it to the network.

The addresses generated by the address generator 511 are stored as multicast addresses in one table in the address administration device 512, together with addresses for one-to-one communication, so as to be administered in a centralized manner, like a conventional DHCP server. One field may be added to this table, as needed, to indicate whether each address is for unicast or multicast communication. FIG. 24 shows a concrete example of such a table. Referring to FIG. 24, a "0" type flag in the type field indicates that the corresponding address is for unicast communication, whereas a "1" type flag indicates that the corresponding address is for multicast communication.

Note that the addresses generated by the address generator 511 belong to the same space. That is, an address alone need not indicate whether it is used for unicast or multicast communication. If, therefore, an address acquisition request indicates multicast communication in acquiring an address or returning a result, a corresponding type flag is set. Otherwise, "unknown" is set. When the generated address is to be returned, if the type flag is "1"/"0", the corresponding information is added to the address to notify it. Otherwise, "unknown" is set. The above techniques and the like are available.

As described above, according to the fifth to eighth embodiments, when multicast communication with respect to specific terminals is supported on the low-level layer, a given terminal sets a high-level multicast address corresponding to the set low-level multicast address upon reception of a notification of the completion of low-level multicast communication setting. In this case, the set high-level multicast address is transferred to another terminal as a destination of multicasting, as needed, and the terminal, which has received the address, stores the multicast address therein, and sets it as routing information. With this operation, in transferring packets to each terminal, transfer information administration is greatly facilitated. In addition, addresses used for conventional one-to-one communication (unicast communication) can be used for multicast communication, and no improvement is required for routing necessary for data transfer on a network. For this reason, compatibility with a conventional system can be ensured, and various conventional address administration tools developed for unicast communication can be used without any modification or with a little improvement.

In multicasting information from a terminal which operates according to a conventional protocol to a specific terminal group, if a corresponding multicast address is known, the information can be transmitted in the same manner as in conventional unicast transfer. That is, the present invention can be more easily applied to conventional systems.

Since no conventional device has the above functions, corresponding functions must be added. In this case, the functions to be added are roughly classified into a function of setting high-level multicast addresses and a function of determining whether a given address is for multicast/unicast communication, and transferring the determination result to the low-level layer. The two functions may be implemented in a conventional apparatus. However, the high-level multicast address setting function can be shared; sharing this function is sometimes more effective. The following method is therefore effective. A unit having the high-level multicast address setting function is prepared independently of the packet transfer unit. A request is output to this unit, and the unit receives the result. In this case, the present invention can be applied to a unit in a conventional system, e.g., a device having an address setting server function, e.g., BOOTP or DHCP in an Internet system with a little improvement. That is, the present invention can be more easily applied to the conventional systems.

A data communication unit including a data controller according to the ninth embodiment will be described next with reference to FIG. 25.

Figure 25:
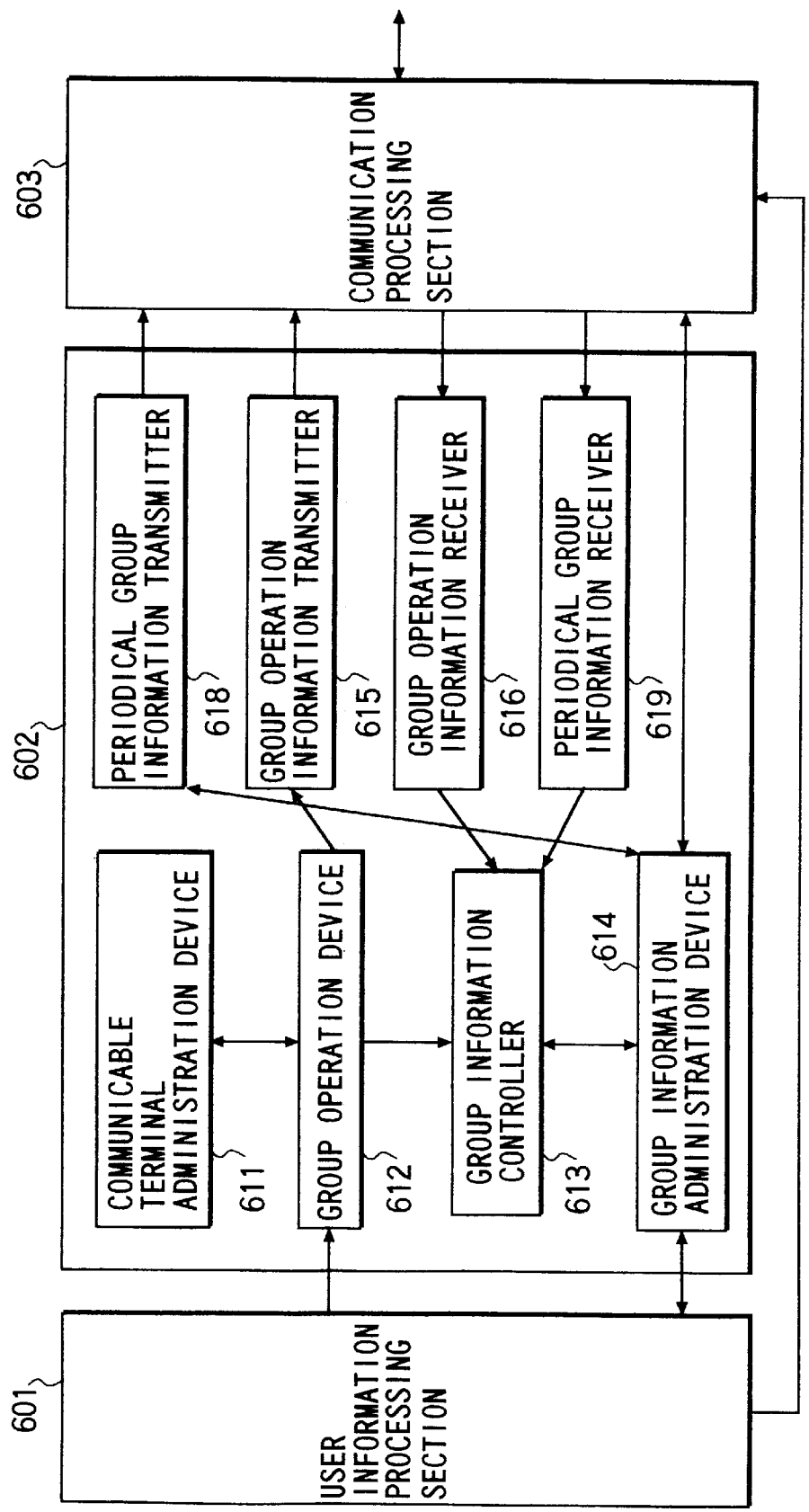
FIG. 25 is a block diagram showing a communication control apparatus according to the ninth embodiment of the present invention.

FIG. 25 shows the arrangement of a given terminal as a data communication unit. This terminal is constituted by a user data processor 601 for executing an application, a group controller 602 for administering a group, and a communication processor 603 for executing communication. A communicable terminal administration device 611 administers data about a terminal which is communicable with the self-terminal. A group operation device 612 performs a group operation such as forming a plurality of designated terminals into a group, participating in a designated group, withdrawing from a designated group, or canceling a designated group, in response to a request from the user data processor 601.

A group information controller 613 updates a group information administration device 614 in response to a request from the group operation device 612 or a group operation data receiver 616. The group information administration device 614 stores group information generated and modified by the self-terminal or another terminal. A periodical group information transmitter 618 periodically transmits the group identification data of the group information administration device 614 and data about group join terminals which are participating in the group as periodical group information.

A group operation data transmitter 615 transmits group operation data which indicates that the group configuration is changed by the group operation device 612. A periodical group information receiver 619 receives periodical group information transmitted from another terminal. When the periodical group information receiver 619 receives periodical group information which has not been registered, the data is registered in the group information administration device 614 by the group information controller 613. The group operation data receiver 616 requests the group information controller 613 to change the data in the group information administration device 614 on the basis of the received group operation data.

The processing performed by the group information controller 613 in the terminal of the ninth embodiment will be described next with reference to FIG. 27.

FIG. 27 shows seven terminals C1 to C6 and Cn. Referring to FIG. 27, the ranges in which the terminals Cn and C4 can directly communicate with other terminals are enclosed within lines. That is, the terminal Cn can communicate with the terminals C1, C2, C3, C4, and C5 but cannot communicate with the terminal C6. FIG. 28 shows a list of terminals with which the terminals C1 to C6 and Cn can communicate.

In each terminal, the communicable terminal administration device 611 administers a table like the one shown in FIG. 29, which indicates specific terminals with which each terminal can communicate. A search for communicable terminals is performed by broadcasting terminal search data. Terminals which respond to the terminal search data are regarded as communicable terminals.

A procedure by which the terminal Cn sets a group together with the terminals C1 and C2 in this state will be described first with reference to the flow chart of FIG. 35.

First of all, the group operation device 612 of the terminal Cn receives a request to form the terminals Cn, C1, and C2 into a group from the user data processor 601 (step a1). The group operation device 612 then checks whether the self-terminal can communicate with all the terminals belonging to the group to be formed (step a2). The group operation unit 612 notifies the group information controller 613 of a group operation attribute and the terminals which will participate in the group. Note that the following four group operation attributes are used:

1. "formation" that is used to set a new group;
2. "participation" that is used to participate in a group which has already been set;
3. "withdrawal" that is used to withdraw from a group in which the corresponding terminal has already participated in; and
4. "cancellation" that is used to cancel a group which has already been set.

Upon reception of a request of "formation" or "participation", the group operation device 612 inquires of the communicable terminal administration device 611 whether the self-terminal can communicate with the terminals C1 and C2. If the self-terminal can communicate with these terminals, the group operation device 612 receives the request and notifies the group information controller 613 of the request. The flow then advances to step a4. If there is an incommunicable terminal, the request is denied. The flow then advances to step a3. In step a3, the incommunicable terminal is removed from the group, and the flow advances to step a4.

In step a4, the group information controller 613 receives a notification from the group operation device 612 and acquires a group operation attribute. In this case, since the group operation attribute is "formation", the group information controller 613 sets group identification data for identifying this group. This group identification data is set by preparing a plurality of group identification data and selecting unused group identification data. The set group identification data and data about terminals which will participate in the group are registered in the group information administration device 614 of each terminal which will participate in the group (step a5). FIG. 31 shows how these data are registered.

In step a6, the terminal Cn multicasts the data about the formed group from the group operation data transmitter 615 to the terminals C1 and C2. FIG. 30 shows the group operation data transmitted from the terminal Cn. In this case, the group operation attribute is "formation", the group identification data is G1, and the group member terminals are the terminals Cn, C1, and Cn.

Each of the group operation data receivers 616 of the terminals C1 and C2 which can receive the group operation data passes the group operation data to the group information controller 613 (step a6). The group information controller 613 acquires the group operation attribute from the group operation data. In this case, since the group operation attribute is "formation", the group information controller 613 registers the group identification data and the group member terminal data of the group operation data in the group information administration device 614 (step a7).

The periodical group information transmitter 618 of each of the terminals Cn, C1, and C2 belonging to the group G1 broadcasts periodical group information like the one shown in FIG. 34. These periodical group information are received by the periodical group information receivers 619 of the terminals C3 to C6 and registered in the group information administration devices 614 by the group information controllers 613. With this operation, the terminals C3 to C6 find out that the currently set group G1 is constituted by the terminals Cn, C1, and C2.

A procedure by which the terminal C4 participates in the set group G1 will be described next with reference to the flow chart of FIG. 36.

In step b1, the group operation unit 612 of the terminal C4 receives a request to take part in the group G1 from the user data processor 601. The group operation unit 612 then notifies the group information controller 613 of the group operation attribute and the group identification data (step b2). Upon reception of the notification from the group operation unit 612, the group information controller 613 acquires the group attribute. In this case, since the group operation attribute is "participation", the group information controller 613 adds the terminal C4 to the terminals participating in the group G1 in the group information administration device 614 (step b3).

The terminal C4 multicasts the data about the terminals participating in the group and the group operation attribute "participation" from the group operation data transmitter 615 to the terminals belonging to the group G1 (step b4). In this case, the group operation attribute is "participation", the group identification data is G1, and the group member terminals are the terminals Cn, C1, C2, and C4. The group operation data receiver 616 of each of the terminals Cn, C1, and C2, which has received this group operation data, passes the group operation data to the group information controller 613 (step b5).

The group information controller 613 acquires the group operation attribute from the group operation data. In this case, since the group operation attribute is "participation", the group information controller 613 adds the terminal C4 to the group participating terminals corresponding to the group identification data "G1" in the group information administration device 614, similar to the transmission side (step b6).

The periodical group information transmitter 618 of each of the terminals Cn, C1, C2, and C4 belonging to the group G1 broadcasts the periodical group information, similar to the group operation attribute "participation". The periodical group information receivers 619 of the terminals C3 to C6 receive these periodical group information to detect that the group G1 is constituted by the terminals Cn, C1, C2, and C4 (step b7).

Note that the operations associated with "withdrawal" and "cancellation" can be performed by procedures similar to the procedure for "participation". In addition, a plurality of groups can be set by performing the operation associated with "formation" a plurality of numbers of times.

Assume that the groups shown in FIG. 31 are set by the above procedure. A procedure by which a new terminal Cx participates in an already set group will be described by taking the state shown in FIG. 32 as an example. FIG. 33 shows the terminals with which the terminals C1 to C3, Cn, and Cx can communicate.

The terminal Cx can communicate with the terminals C1, C2, C4, C6, and Cn. At this time, the periodical group information transmitter 618 of each of the communicable terminals transmits periodical group information like the one shown in FIG. 34. The operation to be performed when the group operation data receiver 616 of the terminal Cx receives the periodical group information will be described below with reference to the flow chart of FIG. 37.

The group operation data receiver 616 of the terminal Cx receives the periodical group information (step c1). The group information controller 613 then checks whether the data has been registered in the group information administration device 614 (step c2).

If the data has been registered, the group information controller 613 updates the group information in the group information administration device 614 (step c3). With this operation, the terminal Cx knows that groups G1, G2, and G3 are currently set. If the data has not been registered, the group information controller 613 newly registers the data in the group information administration device 614 (step c4).

The terminal Cx can take part in the group G1 by the same procedure as that for "participation" described above. The new terminal Cx can perform multicast communication with the terminals Cn, C1, and C2 participating in the group Gi by using the group information which has already been set.

Figure 37:
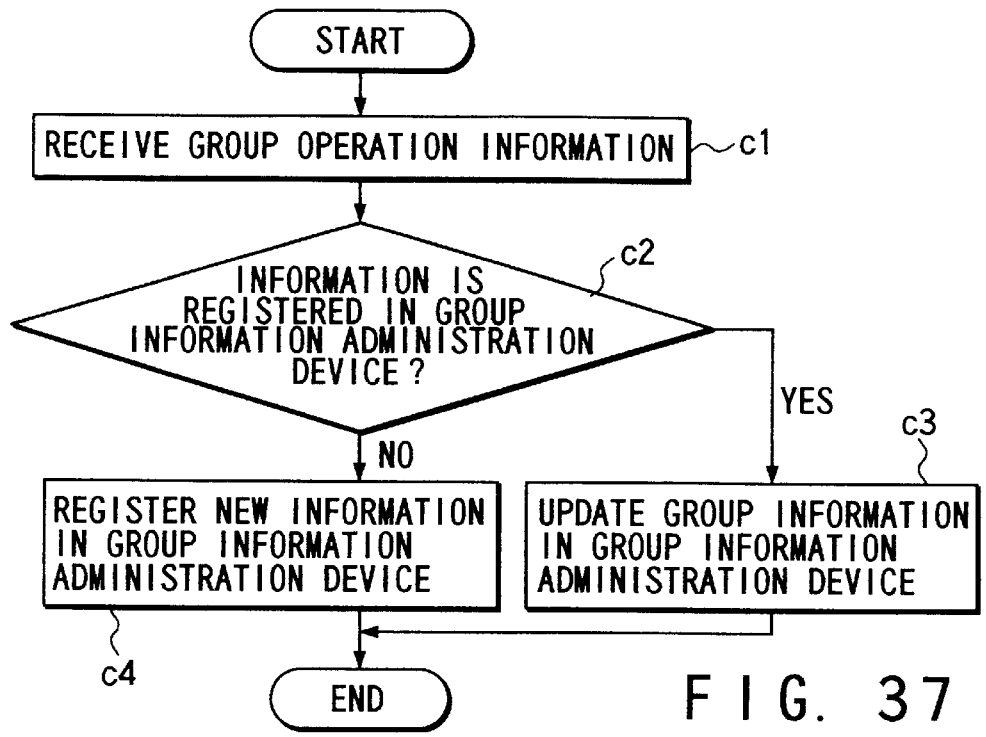
FIG. 37 is a flow chart showing an operation to be performed when a group information administration device 614 of a terminal Cx receives data.

Note that the programs for executing the contents of the flow charts of FIGS. 35, 36, and 37 in the user data processor 601, the group controller 602, and the communication processor 603 are stored in a recording medium such as an FD or a CD-ROM. The program data in this recording medium may be input to an existing computer, and this computer may be operated as the user data processor 601, the group controller 602, and the communication processor 603.

The 10th embodiment will be described next. The processing in the 10th embodiment is performed by the same procedure as that for the processing in the ninth embodiment. The group member terminal data of group operation data received by a group operation data receiver 616 is compared with the data in a communicable terminal administration device 611, and one of the group member terminals which is not registered in the communicable terminal administration device 611 is removed from the group. A method of maintaining the consistency of the group operation data administered by the respective terminals in this state will be described below.

Figure 26:
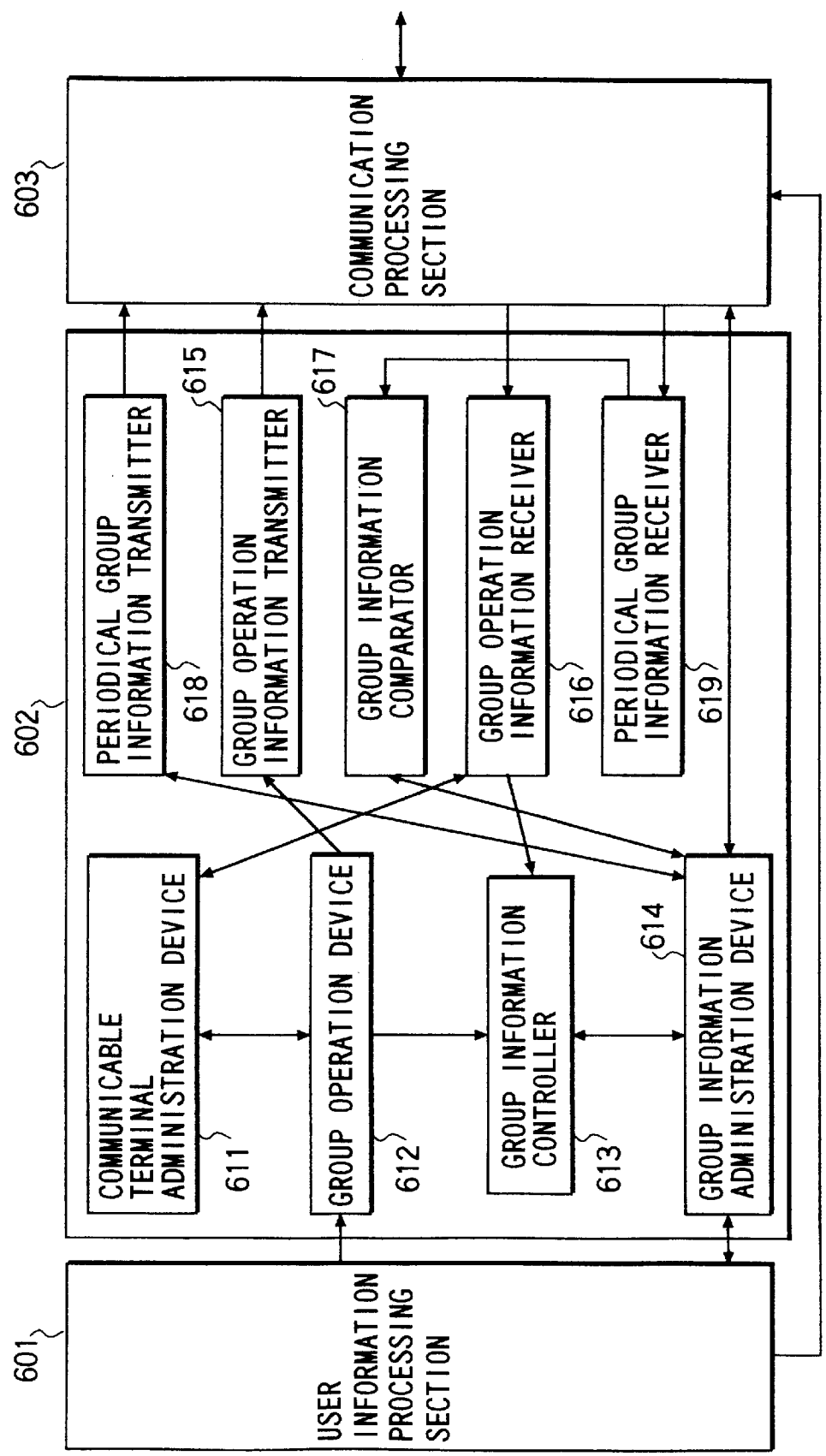
FIG. 26 is a block diagram showing a communication control apparatus according to the 10th embodiment of the present invention.

The 10th embodiment differs from the ninth embodiment in that a group information comparator 617 is added as shown in FIG. 26.

Assume that a terminal Cx appears, and the state shown in FIG. 27 changes to the state shown in FIG. 32. In this case, the terminal Cx registers terminals C1, C2, C4, C6, and Cn in the communicable terminal administration device 611. Each of the terminals C1, C2, C4, C6, and Cn additionally registers the terminal Cx in the communicable terminal administration device 611.

A procedure by which the terminal Cx forms the terminals Cx, C1, C2, and C6 into a group in a state wherein groups like those shown in FIG. 31 have been set by the same procedure as that in the ninth embodiment upon appearance of the terminal Cx will be described with reference to the flow chart of FIG. 38.

First of all, a user data processor 601 of the terminal Cx outputs a request to form the terminals Cx, C1, C2, and C6 into a group to a group operation device 612 (step d1). The group operation device 612 then checks whether the terminals C1, X2, and C6 are registered in the communicable terminal administration device 611 (step d2). If any one of the terminals C1, C2, and C6 is not registered, the formation request is denied, or formation of a group excluding the terminal which is not registered is granted.

In this case, since all the terminals are registered, the request is granted, and group identification data "G10" and the group participating terminals Cx, C1, C2, and C6 are registered as group operation data in a group information administration device 614, and the group operation data is transmitted from a periodical group information transmitter 618 (step d3). The terminals C1, C2, and C6 receive the group operation data (step d4).

In step d5, since the terminal C1 can communicate with the group member terminals Cx, C2, and C6 indicated by the group operation data, the group identification data "G10" and the group participating terminals Cx, C1, C2, and C6 are registered in the group information administration device 614. Since the terminal C2 cannot communicate with the terminal C6, the above data excluding the terminal C6 are registered in the group information administration device 614. Similarly, the terminal C6 registers the above data excluding the terminal C2 in the group information administration device 614. The terminals Cx, C1, C2, and C6 periodically broadcast the periodical group information (step d6).

The processing to be performed when the terminal Cx receives the periodical group information from the terminals C2 and C6 will be described below with reference to the flow chart of FIG. 39.

First of all, the terminal Cx receives the periodical group information from the terminal C2 (step e1). The terminal Cx then checks whether it belongs to the group indicated by the received data. If the terminal Cx belongs to the group, the flow advances to step e4. Otherwise, the flow advances to step e3 (step e2).

In step e3, the data in the group information administration device 614 is updated in accordance with this periodical group information. In step e4, a periodical group information receiver 619 passes the periodical group information to the group information comparator 617. The group information comparator 617 compares the group operation data in the group information administration device 614 with the contents of the received periodical group information. If they coincide with each other, the flow advances to step e4. Otherwise, the flow advances to step e5.

In step e4, the data in the group information administration device 614 is updated in accordance with this periodical group information. Upon this comparison, the terminal Cx knows that the terminal C6 is not a group participating terminal. In this case, the group information comparator 617 stores the data about the terminal C2, and the flow waits for reception of the periodical group information from the terminals C1 and C6.

In step e6, the terminal Cx receives all the periodical group information from the terminals C1, C2, and C6, and compares the periodical group information to find out that communication with the terminals C2 and C6 cannot be performed. In this case, the terminal with the smaller terminal number is removed from the group, and the group operation data in the group information administration device 614 is updated to indicate that the group participating terminals of the group G10 are the terminals Cx, C1, and C6. The same processing is performed with respect to the terminals C1, C2, and C6 to change the participating terminals of the group G10 into the terminals Cx, C1, and C6 in each terminal, thereby maintaining the consistency of the group operation data of the respective terminals.

Note that the terminal with the larger terminal number may be deleted from the group. In addition, if it is determined upon comparison that the group operation data in the group information administration device differs from the contents of the received group operation data, the group may be canceled.

Assume that the communication link between the terminals C2 and C4 is disconnected because the terminal C4 has moved after the group shown in FIG. 31 was formed. In this case, the terminal C4 is deleted from the data in the communicable terminal administration device 611, and the terminal C4 is also deleted from the group G2 in the group information administration device 614. The same operation is performed in the terminal C4. In such a case as well, when each of the terminals Cn, C1, C2, and C4 receives the periodical group information, the data in the group information administration device 614 differs from the received group operation data, and the consistency of the group operation data in the respective terminals can be maintained by the same procedure as that for "formation" described above.

In this manner, the terminals participating in a group can always perform multicast communication while the respective terminals are communicable with each other, and the consistency of the group operation data administered by the respective terminals can be maintained.

Figure 38:
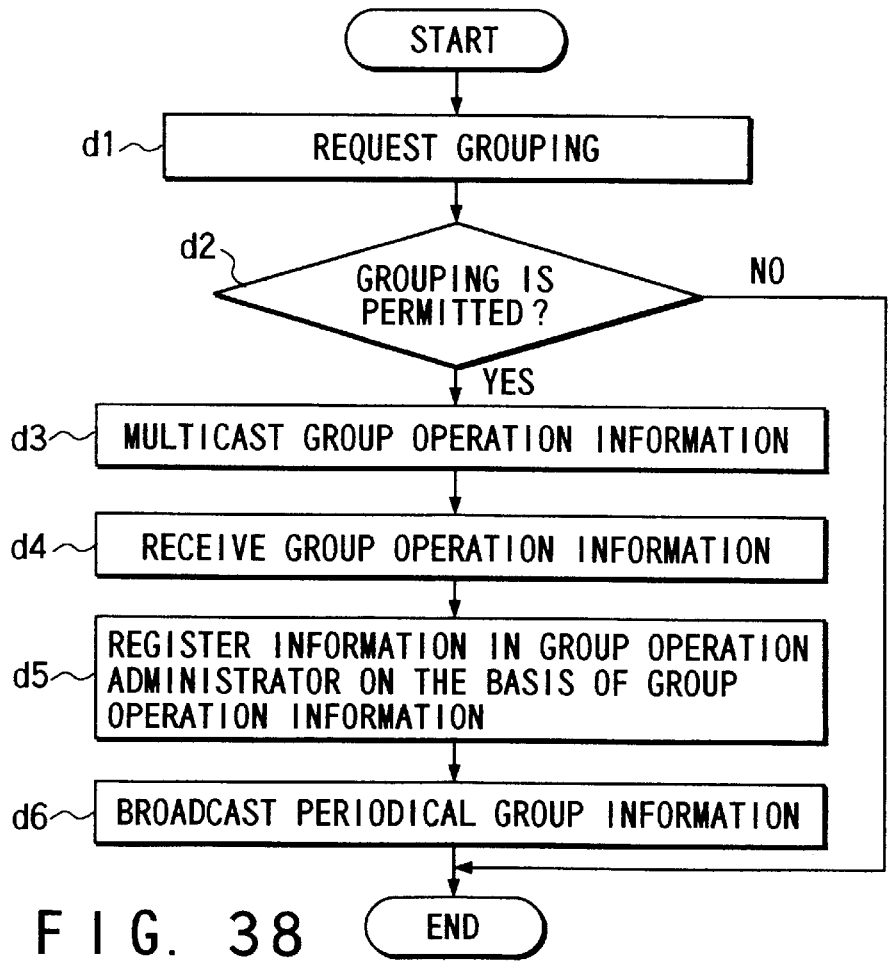
FIG. 38 is a flow chart showing a procedure by which the terminal Cx forms a group, together with the terminals Cx, C1, X2, and X6.

Note that the programs for executing the contents of the flow charts of FIGS. 38 and 39 in the user data processor 601, the group controller 602, a communication processor 603, and the group information comparator 617 are stored in a recording medium such as an FD or a CD-ROM. The program data in this recording medium may be input to an existing computer, and this computer may be operated as the user data processor 601, the group controller 602, and the communication processor 603.

According to the ninth and 10th embodiments, even a terminal which is not currently participating a group can know the contents of the currently set group from periodical group information, and hence can easily participate in the group. In addition, terminals of the group which cannot communicate with each other can be detected, and the communication links between the terminals belonging to the group are ensured, thereby maintaining consistency of the group operation data in the respective terminals.

A multicast communication control apparatus according to the 11th embodiment will be described next with reference to FIG. 40.

Referring to FIG. 40, an output buffer 701 for temporarily storing transmission data is connected to a buffer administration section 702 for administering the data storage state of the buffer. A timer 703 is a transmission timer for determining the transmission timing of an acknowledgment packet. The timer 703 is connected to an acknowledgment packet generating section 708 for generating an acknowledgment packet. A retransmission timer 704 is a timer for determining the retransmission timing of data. The retransmission timer 704 is connected to a data packet generating section 707 for generating a data packet. The data packet generating section 707 transfers the generated transmission data to a reception buffer 705. The data storage state of this buffer is administered by a buffer administration section 706.

The output terminal portion of the data packet generating section 707 is connected to the acknowledgment packet generating section 708 and a multicast communication section 713 for performing multicast communication. The input/output terminal portions of the data packet generating section 707 are connected to a receiver-by-receiver basis acknowledgment number storage section 711. The output of the acknowledgment packet generating section 708 is connected to a sender-by-sender basis reception sequence number storage section 710. The input terminal portions of the receiver-by-receiver basis acknowledgment number storage section 711 are connected to the output terminal portions of a transmission cable 712 and the multicast communication section 713. The output terminal portion of the multicast communication section 713 is connected to the sender-by-sender basis reception sequence number storage section 710 for storing the sequence numbers of data sent on a sender-by-sender basis. The sender-by-sender basis reception sequence number storage section 710 transfers the received sequence numbers to the buffer administration section 702 and a reception group table 709.

Figure 41:
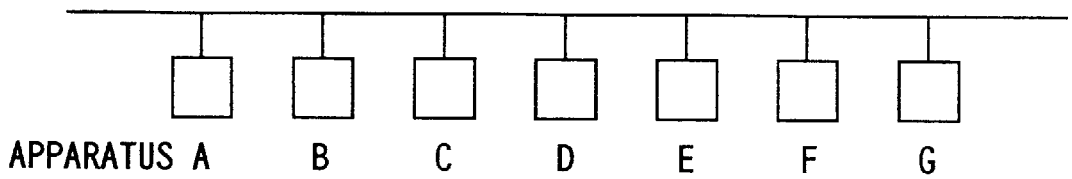
FIG. 41 is a block diagram showing a state in which multicast communication control apparatuses are connected to a multicast communication path.
Figure 42:
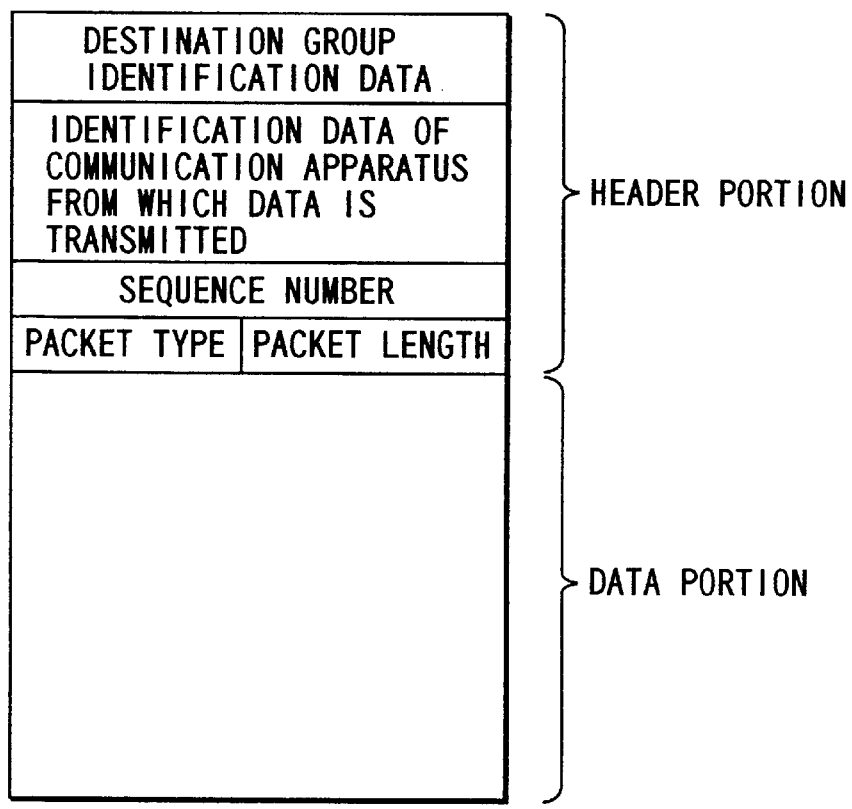
FIG. 42 is a view showing a format which is common to a data packet and acknowledgment packets in the 11th embodiment, and more specifically, a data packet transmitted from an apparatus A to each member of group 2.

A plurality of multicast communication control apparatuses A to G each having the above arrangement are connected to a multicast communication path so that multicast communication can be performed, as shown in FIG. 41. The header portion of a packet used in these multicast communication control apparatuses includes destination group identification data, the identification data of a transmitter, a sequence number, a packet type, and a packet length, as shown in FIG. 42. In this case, the packet type is an area for storing a value set on the transmission side to allow the reception side to identify the received packet as a data packet, an acknowledgment packet, or another type of packet. "0" is set in the field of the sequence number of an acknowledgment packet so as not to have any meaning.

As shown in FIG. 43, each communication apparatus holds, in a reception group table, the identification data of groups to which multicast communication is performed, the identification data of the members of the groups, the maximum sequence numbers of the sequence numbers of data packets continuously received from the respective apparatuses, and the sequence numbers of packets for which acknowledgment packets have been returned. FIG. 43 shows an example of the reception group table of the apparatus A.

As shown in FIG. 44, an acknowledgment packet has, in addition to the header portion, an area for storing the identification data of a group, the number of apparatuses belonging to the group except for the self-apparatus, and pairs of identification data of the respective apparatuses and maximum sequence numbers of the sequence numbers of data packets continuously received therefrom. FIG. 44 shows an example of the acknowledgment packet transmitted from the apparatus A to the remaining apparatuses of group 2.

As shown in FIG. 45, each communication apparatus holds, in a transmission group table, the identification data of groups to which multicast communication is performed, the maximum sequence numbers transmitted from the respective apparatuses to the respective groups, the identification data of the apparatuses as the members of the groups, and the received maximum acknowledgment numbers. FIG. 45 shows an example of the transmission group table of the apparatus A.

<Transmission of Data Packet>

Upon reception of a data transmission request form the high-level layer, the data packet generating section 707 assembles the data into packets, stores them in the reception buffer 705, and adds sequence numbers to them. In this case, the sequence number added to the first data packet transmitted to the corresponding group is "1", and the sequence number is increased by one every time a data packet is transmitted. The retransmission timer 704 is set for each data packet. The multicast communication section 713 multicasts each data packet.

<Reception of Data Packet>

When a packet arrives through a multicast communication path 714, the multicast communication section 713 receives the packet. If the packet is a data packet, the multicast communication section 713 sends it to the sender-by-sender basis reception sequence number storage section 710. If the packet is an acknowledgment packet, the multicast communication section 713 sends it to the receiver-by-receiver basis acknowledgment number storage section 711. Reception of an acknowledgment packet will be described later.

The sender-by-sender basis reception sequence number storage section 710 extracts destination group identification data, the identification data of the communication apparatus which has transmitted the packet, and a sequence number, and compares the sequence number with the maximum sequence number, of the sequence numbers of packets received from the corresponding apparatus, which is stored in the reception group table 709. If the sequence number extracted from the packet is larger than the maximum sequence number and continuous with respect thereto, the maximum sequence number in the reception group table 709 is replaced with the extracted sequence number. In addition, the data portion of the packet is sent to the buffer administration section 702, and the acknowledgment packet transmission timer 703 is set if it is not set. In some cases, the value set in the acknowledgment packet transmission timer 703 is always kept constant. In other cases, random numbers with a certain probability distribution are set. By using random numbers, the number of acknowledgment packets simultaneously transmitted to the multicast communication path 714 can be decreased, and congestion can be prevented. The probability distribution may be a uniform distribution from a minimum value t1 to a maximum value t2, a uniform distribution in which the minimum and maximum values change in proportion to the number of members of a group, or an exponential distribution in which the average value changes in proportion to the number of members of a group.

A value is set in the acknowledgment packet transmission timer 703 at either of the following two timings: the timing at which a data packet is received, as described above; and the timing at which a time out occurs, regardless of whether a data packet is received. In either case, if the timer has been set, no new value is set. When the acknowledgment packet transmission timer 703 reaches a time out, the timer notifies the acknowledgment packet generating section 708 of the time out.

In addition, when more data packets than a certain number which are addressed to the corresponding group arrive, the sender-by-sender basis reception sequence number storage section 710 notifies the acknowledgment packet generating section 708 of the arrival of the data packets.

<Transmission of Acknowledgment Packet>

Upon reception of a notification from the sender-by-sender basis reception sequence number storage section 710 or the acknowledgment packet transmission timer 703, the acknowledgment packet generating section 708 requests the sender-by-sender basis reception sequence number storage section 710 to send the identification data of the respective apparatuses belonging to the corresponding group and the maximum sequence numbers (acknowledgment numbers) continuously received from the respective apparatuses. In addition, the acknowledgment packet transmission timer 703 is reset.

In response to the request, the sender-by-sender basis reception sequence number storage section 710 sends the data of the corresponding group to the acknowledgment packet generating section 708. The acknowledgment packet generating section 708 generates an acknowledgment packet like the one shown in FIG. 44 on the basis of the data received from the sender-by-sender basis reception sequence number storage section 710, and multicasts the packet to the group through the multicast communication section 713.

<Reception of Acknowledgment Packet>

When a packet arrives at the apparatus, the multicast communication section 713 receives the incoming packet, and sends it to the sender-by-sender basis reception sequence number storage section 710 if the packet is a data packet, and to the receiver-by-receiver basis acknowledgment number storage section 711 if the packet is an acknowledgment packet. The receiver-by-receiver basis acknowledgment number storage section 711 extracts a destination group identification data, the identification data of the communication apparatuses to which the data has been transmitted, and the maximum sequence number (acknowledgment number) continuously received, of the data packets transmitted from the self-apparatus, and stores the acknowledgment number in the transmission group table. The receiver-by-receiver basis acknowledgment number storage section 711 then instructs the data packet generating section 707 to delete the data packet which need not be retransmitted.

<Retransmission of Data Packet>

Upon reception of a notification of data packet retransmission from the retransmission timer, the data packet generating section 707 sends the sequence number of the data packet and data pertaining to the destination group to the receiver-by-receiver basis acknowledgment number storage section 711, and requests data indicating whether the data packet has been acknowledged. The receiver-by-receiver basis acknowledgment number storage section 711 compares the sequence number of the data packet with the acknowledgment numbers obtained from the members of the group. If at least one of the acknowledgment numbers is smaller than the sequence number, data indicating that acknowledgment has not been performed is sent to the data packet generating section 707. If acknowledgment has not been performed, the data packet generating section 707 sends the corresponding data packet to the multicast communication section 713. The multicast communication section 713 multicasts the packet.

FIG. 46 shows the arrangement of a multicast communication control apparatus obtained by adding an acknowledgment packet reception confirmation information adding section 715 to the embodiment shown in FIG. 40. This embodiment differs from the embodiment shown in FIG. 40 in the format of a data packet, the processing to be performed upon reception of a data packet, and the processing to be performed to transmit a data packet.

Figure 47:
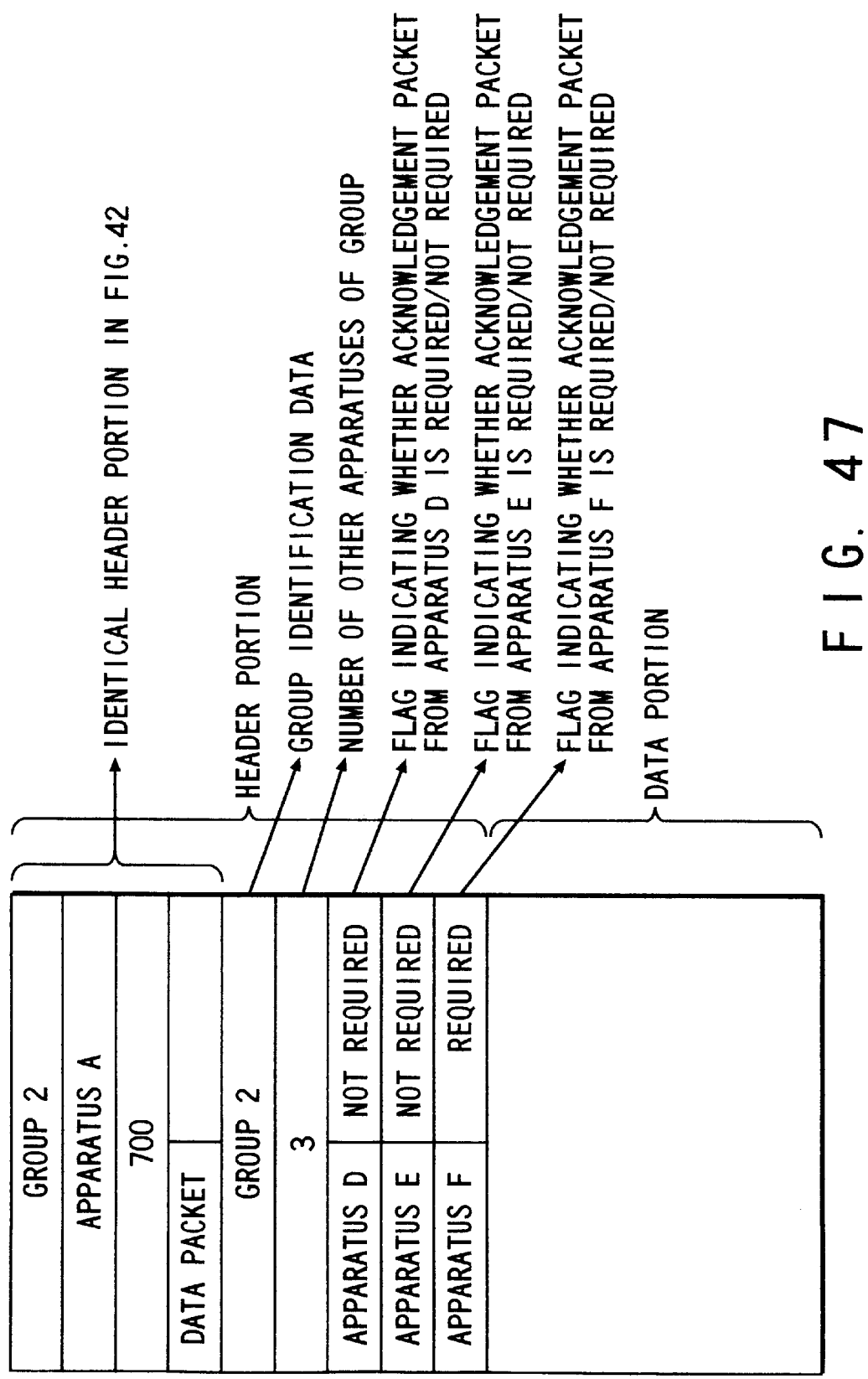
FIG. 47 is a view showing a data packet format in the 12th embodiment, and more specifically, a data packet transmitted from an apparatus A to each member of group 2.

FIG. 47 shows the data format of a data packet used in this embodiment. The header portion stores a flag indicating whether each apparatus needs to transmit an acknowledgment packet. In the case shown in FIG. 7, a packet having the sequence number "700" and transmitted from an apparatus A indicates that no acknowledgment packet has been received from an apparatus F.

<Transmission of Data Packet>

Upon reception of a data transmission request from the high-level layer, a data packet generating section 707 assembles the data into packets, stores them in a buffer, and adds sequence numbers to them. The sequence numbers are added in the same manner as in the embodiment in FIG. 40.

The data packet generating section 707 receives, from the acknowledgment packet reception confirmation information adding section 715, the identification data of an apparatus from which no acknowledgment packet has been received with respect to the data packet, and sets the flag corresponding to the apparatus to "required". A retransmission timer 704 is set, and a multicast communication section 713 multicasts the data packet.

<Reception of Data Packet>

When a packet arrives, the multicast communication section 713 receives the packet, and sends it to a sender-by-sender basis reception sequence number storage section 710 if the packet is a data packet, and to a receiver-by-receiver basis acknowledgment number storage section 711 if the packet is an acknowledgment packet. Reception of an acknowledgment packet will be described later.

The sender-by-sender basis reception sequence number storage section 710 extracts a destination group identification data, the identification data of a communication apparatus from which the packet has been transmitted, a sequence number, and a flag indicating whether an acknowledgment packet from the self-apparatus is required or not, and compares the sequence number with the maximum sequence number of a data packet received from the apparatus, which is stored in a reception group table 709. If the sequence number extracted from the packet is larger than the maximum sequence number in the reception group table and continuous with respect thereto, the maximum sequence number in the reception group table 709 is replaced with the extracted sequence number. In addition, the data portion of the packet is sent to a buffer administration section 702. If the flag extracted from the packet is "required", and the acknowledgment packet transmission timer is not set, the timer is set. When the timer generates a time out, an acknowledgment packet generating section 708 is notified of the time out.

According to the embodiments shown in FIGS. 40 and 46, acknowledgment packets need not be transmitted for all data packets, and the number of acknowledgment packets can be decreased, thereby improving the utilization efficiency of the network. In addition, since concentration of acknowledgment packets on a communication apparatus which has transmitted data packets can be prevented, the load on the apparatus can be reduced. These embodiments are especially effective when the individual communication apparatuses equally transmit data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication system for controlling communications among a plurality of terminals, each terminal comprising:

a first storage configured to store terminal identification data identifying at least one other terminal of the plurality of terminals as a communicable terminal capable of communicating with said each terminal;

a second storage configured to store group information including group identification data identifying any formed group and group member identification data identifying the terminals constituting members of any formed group;

a group operation unit configured to designate terminals to form each group so that each formed group includes said each terminal together with at least one other terminal identified as a communicable terminal by the terminal identification data stored in said first storage, to change membership of any formed group by adding a new terminal as a member or by removing a previously designated terminal from membership or to delete any formed group;

a controller configured to respond to the group operation unit to update the group information in said second storage in accordance with group operation information generated when said group operation unit performs an operation;

a first transmitter configured to transmit the group operation information to any other terminals that are members of a formed group together with the each terminal;

a second transmitter configured to periodically transmit the group information stored in said second storage as periodical group information to at least a terminal which does not belong to a formed group; and a first receiver configured to receive group operation information from another terminal any other terminals belonging to a formed group and to provide the group operation information received from the first receiver to update the group information stored in the second storage in accordance with the received group operation information.

2. The system according to claim 1, further comprising an additional receiver for receiving the periodical group information from another terminal belonging to a particular formed group, a comparator for comparing periodical group operation information received by said additional receiver with the communicable terminal identification data stored in said first storage to provide a comparator output, and an update unit configured to change a configuration of the particular formed group to include only terminals which can communicate with each other as well as with said each terminal on the basis of the comparator output and to update changes to the configuration of the particular formed group in said second storage.

3. A communication method of forming a plurality of terminals capable of communicating with each other into a group, and performing communications within the group, with each terminal performing the steps of:

storing communicable terminal identification data identifying communicable terminals which can communicate with said each terminal;

storing group information including group identification data identifying any formed group and group terminal identification data identifying the terminals included as members of each formed group;

performing group operations and generating corresponding group operation information indicating performance of said group operations including designating one or more of the communicable terminals corresponding to the stored communicable terminal identification data together with said each terminal as members of a group being formed, changing membership of an already formed group by adding a new terminal to the membership or removing an already designated terminal from the membership, or deleting an already formed group;

updating the stored group information in accordance with the generated group operation information associated with designating terminals as members of a formed group, changing membership of an already formed group, or deleting an already formed group;

transmitting the group operation information to the terminals that are members of an already formed group;

periodically transmitting the stored group information as periodical group information to at least a terminal which does not belong to an already formed group; and receiving group operation information from another terminal belonging to each group identified by said stored group information and updating the stored group information in accordance with the received group operation information.

4. The method according to claim 3, further comprising receiving periodical group information from another terminal belonging to a particular group, comparing a terminal identified as belonging to the particular group reconstructed on the basis of the received group information with the stored communicable terminal identification data, and updating a configuration of the particular group to include only terminals capable of communicating with each other on the basis of the periodical group information received when it is determined that a terminal which cannot communicate with another group terminal is included in the group reconstructed on the basis of the group information, and storing the updated configuration of the particular group.

5. A communication system for performing communications among a plurality of terminals, each terminal comprising:
  a user data processor configured to execute an application;
  a group controller configured to administer a group of terminals, said group controller including,
    a communicable terminal administration device which administers data about at least one terminal which can communicate with said each terminal,
    a group operation device configured to respond to a request from the user data processor to perform a group operation and to generate group operation data indicating the operation performed including forming a plurality of designated terminals into a group, participating in the group, withdrawing from the group, or cancelling the group,
    a group information administration device configured to store group information generated and modified by said each terminal or another one of the terminals,
    a group information controller which updates the group information stored in the group information administration device in response to a request from the group operation device or a group operation data receiver,
    a periodical group information transmitter which periodically transmits the group information stored in the group information administration device and data about group terminals which are participating in the group as periodical group information,
    a group operation data transmitter which transmits the group operation data generated by the group operation device, and
    a periodical group information receiver which receives periodical group information transmitted from another terminal; and
  a communication processor configured for executing communication.

6. The communication system according to claim 5, wherein when the periodical group information receiver receives periodical group information which has not been stored in the group information administration device, the group information controller stores the received periodical group information in the group information administration device.

7. The communication system according to claim 5, further including a group information comparator configured for comparing the group operation data in the group information administration device with the contents of the received periodical group information.

8. A communication control apparatus included in a first terminal and controlling communications between the first terminal and at least one of a plurality of second terminals, the communication control apparatus comprising:
  a first storage configured to store identification data identifying individual ones of the second terminals which are capable of communicating with the first terminal so as to form a group together with the first terminal;
  a second storage configured to store group information including identification data identifying each formed group and terminal identification data identifying the second terminals included in each formed group,
  a group operation unit configured to perform group operations including forming each group by designating one or more of the second terminals identified by the identification data stored in the first storage together with the first terminal as members of a group, changing group membership by adding a terminal to any formed group or removing a terminal from any formed group, or deleting an already formed group;
  a controller configured to update the group information in the second storage in accordance with group operation information generated by the group operation unit as to each group operation performed;
  a first transmitter configured to transmit the group operation information to the terminals of each formed group;
  a second transmitter configured to periodically transmit the group information stored in the second storage as periodical group information to at least a terminal which does not belong to any formed group; and
  a receiver configured to receive group operation information from at least one of the second terminals belonging to a formed group, and to update the group information stored in the second storage in accordance with the received group operation information.

9. A communication control method for forming a first terminal and at least one of a plurality of second terminals into a group and for performing communications within the formed group, the first terminal performing the steps of:
  storing identification data identifying individual ones of the second terminals which can communicate with the first terminal;
  storing group information including identification data identifying each formed group and terminal identification data identifying the terminals including in each formed group,
  performing group operations including forming each group by designating one or more of the second terminals identified by the stored identification data to be part of a group, changing configuration of an already formed group by adding a terminal to or removing a terminal from the already formed group, or deleting an already formed group;
  updating the group information in storage in accordance with group operation information generated in response to performing each group operation;
  transmitting the generated group operation information to the second terminals making up each formed group;
  periodically transmitting the stored group information as periodical group information to at least a terminal which does not belong to a formed group; and
  receiving group operation information from at least one of the second terminals belonging to a formed group and updating the stored group information stored in accordance with the received group operation information.

* * * * *